United States Patent
Fiske

(10) Patent No.: US 7,669,236 B2
(45) Date of Patent: Feb. 23, 2010

(54) DETERMINING WHETHER TO GRANT ACCESS TO A PASSCODE PROTECTED SYSTEM

(75) Inventor: Michael Stephen Fiske, San Francisco, CA (US)

(73) Assignee: Biogy, Inc., San Francisco, CA (US)

( * ) Notice: Subject to any disclaimer, the term of this patent is extended or adjusted under 35 U.S.C. 154(b) by 417 days.

(21) Appl. No.: 11/100,803

(22) Filed: Apr. 6, 2005

(65) Prior Publication Data

US 2006/0107316 A1    May 18, 2006

Related U.S. Application Data

(60) Provisional application No. 60/646,463, filed on Jan. 24, 2005, provisional application No. 60/637,536, filed on Dec. 20, 2004.

(51) Int. Cl.
- G06F 7/04 (2006.01)
- G06F 12/14 (2006.01)
- G06F 21/00 (2006.01)
- G06F 9/44 (2006.01)
- G06F 12/00 (2006.01)
- G06F 17/30 (2006.01)

(52) U.S. Cl. ................ 726/18; 713/184; 717/106
(58) Field of Classification Search ............ 726/18; 713/184

See application file for complete search history.

(56) References Cited

U.S. PATENT DOCUMENTS

| | | | |
|---|---|---|---|
| 5,402,492 A | 3/1995 | Goodman et al. | |
| 5,481,672 A * | 1/1996 | Okuno et al. | 726/32 |
| 5,612,683 A | 3/1997 | Trempala et al. | |
| 5,616,683 A | 4/1997 | Neuert et al. | |
| 5,825,880 A | 10/1998 | Sudia et al. | |
| 5,903,225 A | 5/1999 | Schmitt et al. | |
| 5,923,756 A * | 7/1999 | Shambroom | 713/156 |
| 5,963,656 A | 10/1999 | Bolle et al. | |

(Continued)

FOREIGN PATENT DOCUMENTS

WO    WO 02/35453 A1    5/2002

(Continued)

OTHER PUBLICATIONS

Oprea, Aline. Balfanz, Dirk. Durfee, Glenn. Smetters, D.K. "Securing a Remote Terminal Application with a Mobile Trusted Device". 20th Annual Computer Security Applications Conference. Pub. Dec. 2004. Relevant pp. 438-447. Found on the World Wide Web at: http://ieeexplore.ieee.org/stamp/stamp.jsp?tp=&arnumber=1377251&isnumber=30059.*

(Continued)

*Primary Examiner*—William R Korzuch
*Assistant Examiner*—Jeremiah Avery
(74) *Attorney, Agent, or Firm*—David Lewis

(57) ABSTRACT

The security of an entity is protected by using passcodes. A passcode device generates a passcode. In an embodiment, the passcode is generated in response to receipt of user information. The passcode is received by another system, which authenticates the passcode by at least generating a passcode from a passcode generator, and comparing the generated passcode with the received passcode. The passcode is temporary. At a later use a different passcode is generated from a different passcode generator.

24 Claims, 18 Drawing Sheets

U.S. PATENT DOCUMENTS

| | | | |
|---|---|---|---|
| 6,035,398 A | | 3/2000 | Bjorn |
| 6,112,187 A | | 8/2000 | Fukawa |
| 6,154,879 A | | 11/2000 | Pare et al. |
| 6,307,956 B1 | | 10/2001 | Black |
| 6,308,268 B1 | | 10/2001 | Audebert |
| 6,311,270 B1 | | 10/2001 | Challener et al. |
| 6,314,425 B1 | | 11/2001 | Serbinis et al. |
| 6,421,453 B1 | * | 7/2002 | Kanevsky et al. ........... 382/115 |
| 6,480,958 B1 | * | 11/2002 | Harrington ................ 713/184 |
| 6,607,136 B1 | * | 8/2003 | Atsmon et al. ............. 235/492 |
| 6,636,973 B1 | | 10/2003 | Novoa et al. |
| 6,748,588 B1 | * | 6/2004 | Fraser et al. ................ 717/146 |
| 6,782,120 B2 | | 8/2004 | Modl et al. |
| 6,956,833 B1 | | 10/2005 | Yukie et al. |
| 6,956,883 B2 | | 10/2005 | Komoto |
| 6,970,183 B1 | * | 11/2005 | Monroe ...................... 348/143 |
| 7,012,503 B2 | | 3/2006 | Nielsen |
| 7,020,645 B2 | | 3/2006 | Bisbee et al. |
| 7,028,185 B2 | | 4/2006 | Wheeler et al. |
| 7,066,382 B2 | | 6/2006 | Kaplan |
| 7,069,444 B2 | | 6/2006 | Lowensohn et al. |
| 7,142,699 B2 | | 11/2006 | Reisman et al. |
| 7,205,882 B2 | | 4/2007 | Libin |
| 7,308,708 B2 | | 12/2007 | Blume |
| 7,319,987 B1 | | 1/2008 | Hoffman et al. |
| 7,353,541 B1 | | 4/2008 | Ishibashi et al. |
| 7,360,087 B2 | * | 4/2008 | Jorgensen et al. ........... 713/168 |
| 7,366,900 B2 | * | 4/2008 | Shambroom ................ 713/168 |
| 7,373,515 B2 | * | 5/2008 | Owen et al. ................. 713/182 |
| 7,415,614 B2 | | 8/2008 | Guillou |
| 7,423,515 B1 | | 9/2008 | Fiske et al. |
| 7,565,548 B2 | | 7/2009 | Fiske et al. |
| 2001/0037450 A1 | | 11/2001 | Metlitski et al. |
| 2002/0040346 A1 | | 4/2002 | Kwan |
| 2002/0095586 A1 | | 7/2002 | Doyle |
| 2002/0111942 A1 | | 8/2002 | Campbell et al. |
| 2003/0063782 A1 | | 4/2003 | Acharya |
| 2003/0152947 A1 | | 8/2003 | Crossman et al. |
| 2003/0156011 A1 | | 8/2003 | Modl et al. |
| 2003/0158960 A1 | * | 8/2003 | Engberg ...................... 709/237 |
| 2003/0169910 A1 | | 9/2003 | Reisman |
| 2004/0187018 A1 | * | 9/2004 | Owen et al. ................. 713/200 |
| 2004/0199775 A1 | | 10/2004 | Ser et al. |
| 2004/0267387 A1 | | 12/2004 | Samadani |
| 2005/0036611 A1 | | 2/2005 | Seaton, Jr. et al. |
| 2005/0193198 A1 | | 9/2005 | Livowsky |
| 2005/0210267 A1 | | 9/2005 | Sugano |
| 2006/0107040 A1 | | 5/2006 | Fiske |
| 2006/0107041 A1 | | 5/2006 | Fiske |
| 2006/0107063 A1 | | 5/2006 | Fiske |
| 2006/0107064 A1 | | 5/2006 | Fiske |
| 2006/0107065 A1 | | 5/2006 | Fiske |
| 2006/0107067 A1 | | 5/2006 | Safal et al. |
| 2006/0107068 A1 | | 5/2006 | Fiske |
| 2006/0107309 A1 | | 5/2006 | Fiske |
| 2006/0107312 A1 | | 5/2006 | Fiske |
| 2006/0107315 A1 | | 5/2006 | Fiske |
| 2006/0107316 A1 | | 5/2006 | Fiske |
| 2006/0117188 A1 | | 6/2006 | Fiske et al. |
| 2006/0230284 A1 | | 10/2006 | Fiske |
| 2007/0118754 A1 | | 5/2007 | Togashi et al. |
| 2008/0288786 A1 | | 11/2008 | Fiske |
| 2009/0158049 A1 | | 6/2009 | Fiske |
| 2009/0178115 A1 | | 7/2009 | Fiske |

FOREIGN PATENT DOCUMENTS

| | | |
|---|---|---|
| WO | PCT/US05/41799 | 5/2006 |
| WO | PCT/US05/46215 | 6/2006 |
| WO | PCT/US06/02271 | 8/2006 |

OTHER PUBLICATIONS

Stosz JD et. al: "Automated System for Fingerprint Authentication Using Pores and Ridge Structure" Proceedings of the SPIE—The International Society for Optical Engineering, SPIE, PO Box 10 Bellingham WA 98227-0010 USA, vol. 2277, Jul. 28, 1994, pp. 210-223, ISSN: 0277-786X.

Andrea R Roddy et. al: "Fingerprint Features-Statistical Analysis and System Performance Estimates" 19970901, vol. 85, No. 9, Sep. 1, 1997.

Roddy et. al: "Fingerprint feature processing techniques and poroscopy" Jan. 1, 1999, Intelligent Biometric Techniques in Fingerprint and Face Recognition, Boca Raton, FL: CRC Press, US, pp. 37-105 * 3.3 and 5; pp. 56-59.

Bindra B et. al: "Poroscopy: A method of personal identification revisited" Anil Aggrawal's Internet Journal of Forensic Medicine and Toxicology, Anil Aggrawal's Internet Journal of Forensic Medicine and Toxicology, India, vol. 1, No. 1, Jan. 1, 2000, ISSN: 0972-8074 [retrieved on May 16, 2000].

Henry Lee et. al (editor): "Advances in Fingerprint Technology, Second Edition, Chapter 8: Automated Fingerprint Identification and Imaging Systems" Jun. 15, 2001, Advances in Fingerprint Technology; [CRC Series in Forensic and Police Science], CRC Press LLC, Boca Raton, Florida, USA, pp. 275-326.

Christopher Champod et. al: "Fingerprints and Other Ridge Skin Impressions, Passage" Apr. 27, 2004, Fingerprints and Other Ridge Skin Impressions, CRC Press LLC, 2000 N.W. Corporate Blvd., Boca Raton, Florida 33431, BNS pp. 1-9 * figures 2.3, 2.5; table 2.1.

* cited by examiner

FIG. 4
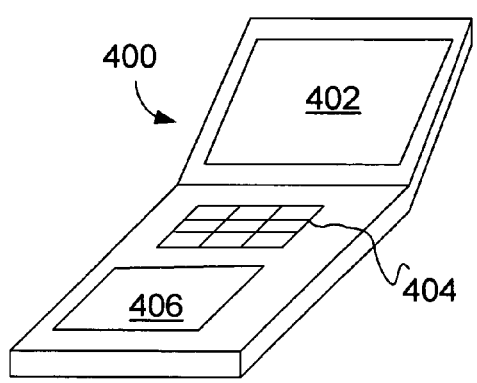
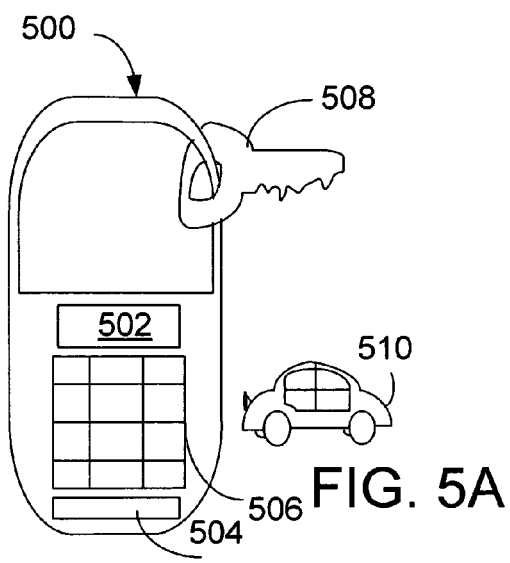
FIG. 5A

DETERMINING WHETHER TO GRANT ACCESS TO A PASSCODE PROTECTED SYSTEM

CROSS-REFERENCE TO RELATED APPLICATIONS

This application claims priority benefit of U.S. Provisional Patent Application No. 60/646,463, filed Jan. 24, 2005; this application also claims priority benefit of U.S. Provisional Patent Application No. 60/637,536, filed Dec. 20, 2004, which are both incorporated herein by reference. This application incorporates herein by reference U.S. Provisional Patent Application No. 60/629,868, filed Nov. 18, 2004. This application also incorporates herein by reference U.S. Provisional Patent Application No. 60/631,199, filed Nov. 26, 2004. This application also incorporates herein by reference U.S. patent application Ser. No. 10/778,503, filed Feb. 15, 2004. This application also incorporates herein by reference U.S. patent application Ser. No. 10/889,237, filed Jul. 11, 2004.

FIELD

The specification generally relates to security and preventing access to an entity by unauthorized entities.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions, and various problems, which may have been first recognized by the inventor.

In many applications a password is required to grant access to a system or authorize a transaction. Today many users have so many different passwords that it is difficult to remember them. In other cases, a password can be stolen by a thief, making passwords susceptible to fraud.

BRIEF DESCRIPTION

In the following drawings like reference numbers are used to refer to like elements. Although the following figures depict various examples of the invention, the invention is not limited to the examples depicted in the figures.

FIG. 4 shows an example of a passcode device.

FIG. 5A shows an example of the system of FIG. 1A.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies that may be discussed in the specification, and some embodiments may not address any of these deficiencies.

In general, at the beginning of the discussion of each of FIGS. 1A-6 is a brief description of each element, which may have no more than the name of each of the elements in the one of FIGS. 1A-6 that is being discussed. After the brief description of each element, each element is further discussed. In some of FIGS. 1A-6 the further discussion of each element is usually in the numerical order of the elements. In some of FIGS. 1A-6 the further discussion of each element discusses a group of the elements together. In some of FIGS. 1A-6 after the further discussion of each element, there is a discussion of how all the elements cooperate with one another. In general, each of FIGS. 1A-14 is discussed in numerical order and the elements within FIGS. 1A-14 are also usually discussed in numerical order to facilitate easily locating the discussion of a particular element. Nonetheless, there is no one location where all of the information of any element of FIGS. 1A-14 is necessarily located. Unique information about any particular element or any other aspect of any of FIGS. 1A-14 may be found in, or implied by, any part of the specification.

Figure 1A:
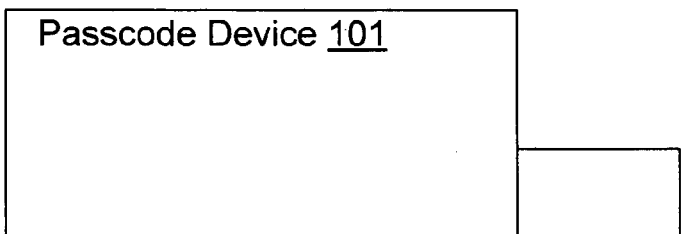
FIG. 1A shows a block diagram of an example of a system for maintaining the security of a secure entity.

FIG. 1A is a block diagram of an example of a system 100. System 100 includes a passcode device 101, an administrator 102, and a secure entity 103. In other embodiments system 100 may not have all of the components listed above or may have other components instead of and/or in addition to those listed above.

System 100 is an example of a system in which the security of a secure entity is kept by requiring a user to submit a passcode (e.g., a password) in order to gain access to the secure entity. The term "user" refers to someone that has access to passcode device 101. The user may use passcode device 101 to gain access to a secure entity. Any sequence of bits (which may represent any string of symbols) may be used as a passcode. In some cases, the passcode may be directly transmitted without human intervention to the administrator, so the sequence of bits may not have a visual display in standard formats such as ASCII, Unicode, and so on. For example, the first sequence of 8 bits in the passcode could in ASCII represent the end of file character, which currently does not have a visual representation. In other embodiments where the passcode is displayed as a sequence of symbols on a graphical display, then the symbols may be chosen from any subset of or combination of alphanumeric, punctuation, picture symbols, math, upper case, and/or lower case symbols, for example. The choice of alphanumeric symbols may include characters from a multiplicity of languages. An example of an alphanumeric passcode with 8 symbols 4R1pa5Wx. An example of a possible passcode with 8 symbols is ♀3♪♫♩☼ℑ☺. An example with 16 symbols including punctuation and other symbols is &x#WДЯq61!j$uS_m.

Passcode device 101 may be used for generating passcodes and/or for setting up a new user in system 100. Setting up a new user may include "registering" the new users. Registering a new user refers to the process of adding a new user so that the new user is able to use a system, such as passcode device 101 or system 100. Passcode device 101 may have multiple other uses.

In an embodiment, passcode device 101 generates a new passcode each time a user wants to gain access to the secure entity. In an embodiment, after the passcode is used, the passcode is discarded and is not stored. In an embodiment, after a passcode is used once, the passcode will no longer enable access to the secure entity. In an embodiment, passcode device 101 also acquires and/or stores information about a user that is used for identifying the user. When the user wants to access the secure entity, the user enters at least some identifying information (e.g., a valid fingerprint) into passcode device 101. If passcode device 101 is able to match the identifying information with identifying information stored in passcode device 101, then passcode device 101 generates a passcode, which may be used for gaining entry to a secure entity (e.g., a newly acquired fingerprint may be matched with information derived from earlier acquired fingerprints). The identifying information may be stored in passcode device 101 in association with a user ID. Thus, in this embodiment, each time a user submits identifying information to the passcode device 101, a new one-time passcode is created. An embodiment of the passcode device 101 uses a secure device (as passcode device 101) that produces unique passcodes from the identifying information, and the unique passcodes can be used as one-time passcodes. In an embodiment, for each acquired set of identifying information, the derived passcodes created are unique. In an embodiment in which the passcode may only be used once, the user does not have to remember her passcode. For example, passcode device 101 may generate a new passcode every time a user submits a valid fingerprint. In an embodiment in which a new passcode is generated for each request for access, stealing the passcode is of, at best, limited use, because after the passcode has been used, the passcode is no longer valid.

In other embodiments, passcode device 101 generates a new passcode less frequently than every time a user submits valid identifying information. For example, a new passcode may be generated every other time or on a random schedule, which the user may be unaware of. In an alternative embodiment, the passcode may be used multiple times prior to being discarded. In an alternative embodiment, the passcode is stored for a brief period of time, which may extend beyond the passcodes initial use. The discarding of the passcode may depend upon the number of uses and/or a length of period of time after the passcode was generated.

In an alternative embodiment, the frequency of repeated passcodes issued to different users is low enough such that it is unlikely that one of two users that have been issued the same passcode will try to access secure entities that only the other of the two is entitled to access. In an embodiment, the frequency of passcodes issued to the same user being repeated is low enough that it is unlikely that the interception of an old passcode will be useful to a hacker. Since the passcode is not stored beyond an expiration time, the passcode itself cannot be stolen accept during the brief period between the time the passcode is generated and the passcode expires. In an embodiment in which the passcode is valid for only one use, the passcode does not need to be stored at all and can only be stolen during the brief period between when the passcode is generated and used. In an embodiment, each time the user enters user information (e.g., a fingerprint) the current passcode is displayed or transmitted (whether or not the current passcode is a one-time passcode), and consequently, the user does not need to remember the passcode.

In an embodiment, a timestamp may be associated with a one-time passcode or other passcode. If the current time is later than the associated timestamp, when the passcode is submitted to an "administrator," then the passcode has expired, is invalid, and access would be denied. The word administrator is used to refer to an entity that grants or denies access to the secure entity.

There are many types of identifying information that may be stored by passcode device 101, such as fingerprints, a name, a birthday, a favorite number, a social security number, and/or a driver's license, a profile, an image of a face, an iris scan, a toe print, a handprint, and/or a footprint. In an embodiment, the item used to generate the passcodes is any item that is unique. In this specification, using a first item (e.g., a fingerprint) to "generate" a second item (e.g., a passcode) may refer to using the first item to "directly" generate the second item or to "indirectly" generate the second item by, for example, first generating one or more intermediary items from which the second item is ultimately generated. The intermediary items may include a chain of multiple intermediary items that each generated one from another. In an embodiment the item used to generate the passcode is one that is difficult to fabricate, guess, find by trial and error, and/or compute. In an embodiment, the item used to generate the passcodes is uniquely associated with the user. In an embodiment, the item used to generate the passcodes has an unpredictable element to it (e.g., the unpredictable manner in which the patterns of lines in fingerprints differ between fingerprints).

During a registration process identifying information about a new user may be stored in passcode device 101. In an embodiment passcode device 101 includes a secure area for acquiring identifying information, storing the identifying information, and/or information related to, or derived from, the identifying information. The secure area is discussed further in conjunction with FIG. 6. The registration process is discussed further in conjunction with FIGS. 1B, 1C, 8, and 11.

In addition, optionally, the passcode device 101 can be a standalone and/or portable device. It is more difficult for an attacker to gain access to passcode device 101 if passcode device 101 is a standalone device, because there are less opportunities for another device to inspect or otherwise access the contents of passcode device 101 compared to if passcode device 101 is not a standalone device. Additionally, in an embodiment in which passcode device 101 is a standalone device, it is more difficult for an unauthorized entity to steal the identifying information associated with the user than were passcode device 101 not a standalone device.

The portable embodiment enables users to generate one time passcodes in remote places, such as inside an airplane, on an oil tanker, on a ship, in a warehouse with shipping containers using wireless communication, in a satellite, at places at which an AC power source is difficult to access or inaccessible, and/or at other places. More details about various possible embodiments of passcode device 101 are discussed in conjunction with subsequent FIGS. 1B-14.

Administrator 102 receives the requests for access to a secure entity from passcode device 101, and decides how to handle the request. For example, administrator 102 may receive a passcode from passcode device 101 and may cause the passcode to be authenticated. In an embodiment, administrator 102 may check, or cause other entities to check, whether a passcode is derived from one of the registration codes and/or passcode generators stored in the database.

Similar to the passcode, any sequence of bits or sequence of symbols may be used as a registration code. In some cases, the registration code may be directly transmitted without human intervention to the administrator, so the sequence of bits may not have a visual display in standard formats such as ASCII, Unicode, and so on. For example, the first sequence of 8 bits in the registration code could in ASCII represent the end of file character, which currently does not have a visual representation. In other embodiments where the registration code is displayed as a sequence of symbols on a graphical display, then the symbols may be chosen from any subset of or combination of alphanumeric, punctuation, picture symbols, math, upper case, and/or lower case symbols, for example. The symbols that the user may choose from may be any subset of or combination of alphanumeric, punctuation, math, upper case, and/or lower case symbols, for example. The choice of alphanumeric symbols may include characters from a multiplicity of languages. An example of a registration code with 16 symbols is 1Ae58GnZbk3T4pcQ and a registration code with punctuation and other symbols may also be used. An example with 32 symbols is 1!56hs#K♀3_4xP*7:y2iW=K; r.+4vN? There may be at least one unique registration code for each user and/or passcode device 101. The same criterion and/or restrictions for both passcodes and registrations codes for determining what sequences of characters are valid.

Administrator 102 may be a human being, software, a computer, an electromechanical lock, or other machine that grants a particular user access to its resources and/or enables a particular event (e.g., a financial transaction, or landing a plane at an airport, and so on). Administrator 102 has the capability (e.g., authority) to grant or deny the user, associated with passcode device 101, access to the secure entity. If the passcode is found to be authentic, then administrator 102 grants the user, associated with passcode device 101, access to the secure entity. In an embodiment, the passcode is accepted by administrator 102 only once. In an embodiment, after accepting the passcode, administrator 102 expects a different passcode for the next request.

Several different embodiments are discussed above in conjunction with passcode device 101 that relate to different criterion and/or durations of time for when a passcode is valid. Administrator 102 has a corresponding way of behaving in terms of whether a given passcode is accepted depending on the embodiment. For example, in an embodiment in which the passcode is valid for only a specified number of uses (which may be a relatively small number of uses) instead of being valid for only one use, administrator 102 accepts the passcode as valid for only the specified number of times. In an alternative embodiment, the passcodes validity may be dependent on time period (which may be relatively short) instead of, or in addition to, being valid for only one or a specified number of uses. As another example, in an embodiment in which the passcode is associated with a timestamp, administrator 102 may deny access for a passcode submitted with an expired timestamp.

In an embodiment, to authenticate a passcode instead of comparing the passcode to a previously received passcode, administrator 102 generates the passcode independently from passcode device 101. Consequently, in this embodiment, instead of storing the actual passcode, administrator 102 stores a method of generating the passcode that is expected to result in the same passcode generated by passcode device 01. In an embodiment, administrator 102 stores and/or uses the same method of generating passcodes that passcode device 101 uses.

In an embodiment in which passcode device 101 and administrator 102 use the same method for generating a passcode, the registration process may involve associating a particular method of generating passcodes with a user and/or passcode device 101. The registration process may involve synchronizing the methods used by passcode device 101 and by administrator 102 so that at a particular attempt to gain access, administrator 102 and passcode device 101 generate the same passcode. The registration process may involve associating a particular registration code (which may also be referred to as a seed) with a particular user and/or passcode device 101. Administrator 102 may be part of the secure entity, a separate entity, and/or may be located in location that is remote from the secure entity.

Secure entity 103 is the secure entity that the user (which is associated with passcode device 101) desires to access. Secure entity 103 is the entity to which administrator 102 has the capability to determine whether the user is entitled to access. Some examples of secure entities are locks, doors, cars, houses, websites, bank accounts, ATMs, medical records, authorization to perform a financial transaction, or some other type of event that requires security.

The lines connecting passcode device 101, administrator 102, and secure entity 103 represent paths of communication. These lines may represent physical communication lines, wireless communications, sonar communications, verbal communications, and/or other communications. The dashed part of the line connecting passcode device 101 with secure entity 103 indicates the capability of administrator 102 to prevent or allow access to secure entity 103.

Although in FIG. 1A only one passcode device 101, administrator 102, and secure entity 103 are illustrated, there may be a multitude of passcode devices 101 that can access secure entity 103 and each passcode device 101 may be able to access multiple secure entities 103. Similarly, there may be several administrators 102 that are capable of granting access to a particular secure entity 103, and each administrator may be capable of granting access to several secure entities 103. Further, a particular passcode device 101 may have a choice of several administrators 102 via which to gain access to a particular secure entity 103.

Figure 1B:
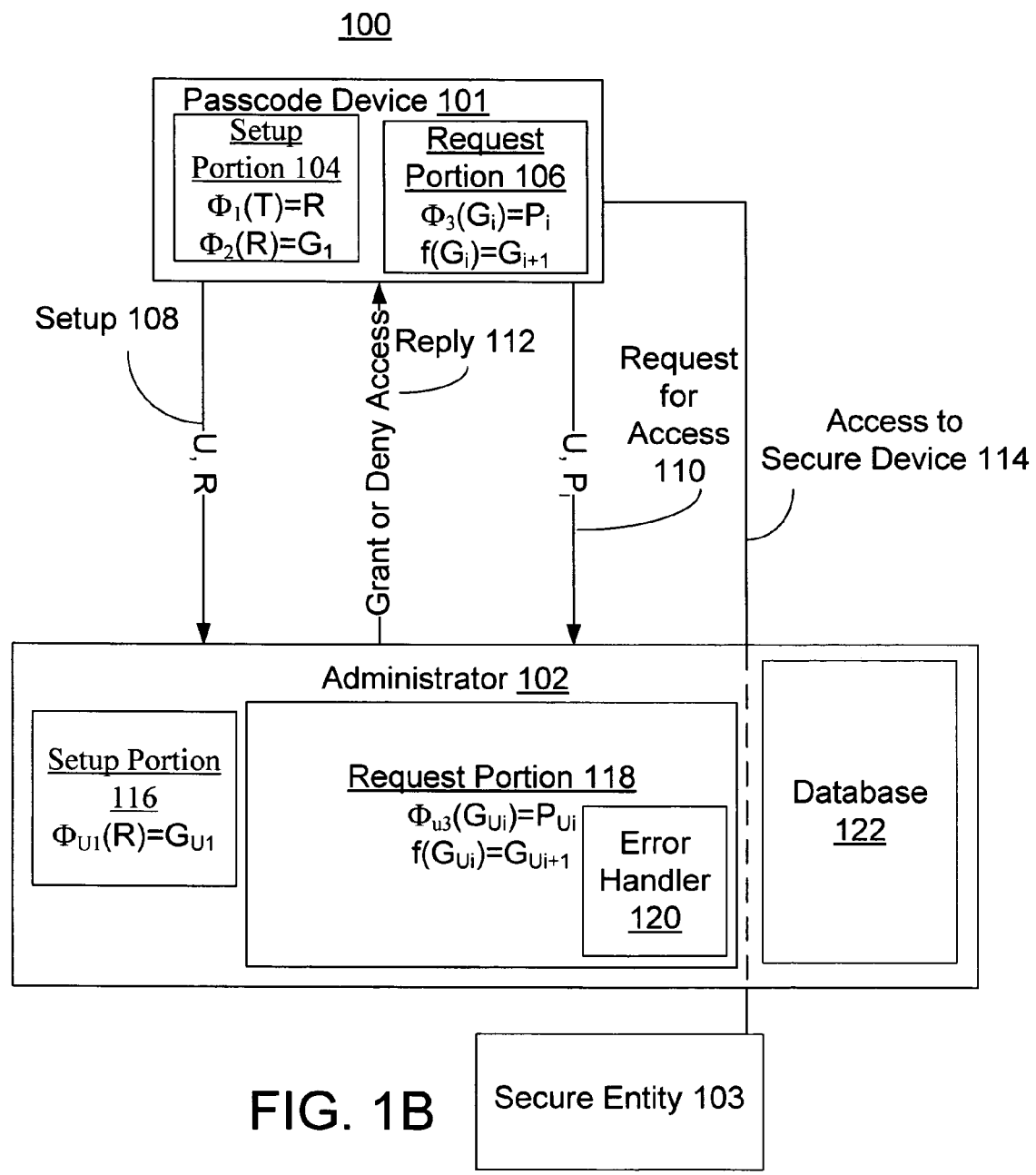
FIG. 1B shows a block diagram of an example of the system of FIG. 1A.

FIG. 1B shows one of many possible embodiments of system 100. In the embodiment of FIG. 1B, passcode device 101 includes setup portion 104 and request portion 106. In the embodiment of FIG. 1B, system 100 includes setup 108, request for access 110, reply 112, access to secure device 114, and administrator 102. Administrator 102 may include setup portion 116 and request portion 118. Request portion 118 may include error handler 120. In other embodiments system 100 may not have all of the components listed above or may have other components instead of and/or in addition to those listed above.

In FIG. 1B, each passcode, denoted as $P_i$, is a sequence of bits or a sequence of symbols. Although this specification uses a specific notation, the invention is in no way limited by this notation. Software implementing the methods of this specification may use a notation that is unrelated to the notation used in this specification. Setup portion 104 may be used for registering a new user, configuring passcode device 101, and/or for setting up passcode device 101. Setup portion 104 acquires identification information, T. In an embodiment, setup portion 104 may generate a registration code, which may be denoted as R, for the sake of registering the user with another entity.

In an embodiment, a method, $\Phi_1$, may be used for generating registration code R from the identification information. The method $\Phi_1$ (which may be referred to as a generating method) may be a "one-way" method such as a one-way algorithm, a one-way function, and/or another one-way method. For example, the registration code may generated according to the equation $\Phi_1(T)=R$. A one-way method, herein denoted $\Phi_1$ (possibly having one or more indices representing different functions associated with different users or applications), has the property that given an output value z, it is computationally extremely difficult to find the input $m_z$ such that $\Phi_1(m_z)=z$. In other words, a one-way method is a method $\Phi_1$ that can be easily computed, but whose inverse $\Phi_1^{-1}$ is extremely difficult (e.g., impossible) to compute. One way to quantify the difficulty to compute $\Phi_1$ given an output z, is to use the number of computations that are expected to be required to compute and/or guess $\Phi_1$. For one type of method, it is expected to take between $O(2^{n/2})$ and $O(2^n)$ computational steps to find or guess $m_z$, (depending on the how clever the one performing the computations is) where n is the number of bits in the output z. By using a one-way method for computing the registration code, even if the registration code is intercepted or otherwise stolen, it is unlikely that the registration code can be used to discover identifying information T.

One set of methods that may be used are one-way functions in which finding the inverse involves an operation that is mathematically indeterminate, impossible, intractable, or computationally impractical or difficult. For example, one method is to use a collection of step functions each of whose domain and range is [0, 1, 2, . . . 255] and apply a distinct step function to a part of T. The information from T could be used to determine which step functions to select from the collection. If 16 step functions are chosen from the collection, then this would create an output of 128 bits. If n step functions are chosen from the collection, then this would create an output of 8n bits. An alternative to this would be to construct 32 matrices resulting from the step functions and compute the determinant modulo 256 for each of the 32 matrices. This creates a one-way function whose output is 256 bits. As another example, method $\Phi_1$ could involve first represent user information T by a string of digits. Then, each digit of the string of digits could be multiplied by a corresponding digit from another string of digits, where at least one digit of the other string has a value of zero. The inverse of this method would involve at least one division by zero for each multiplication by a digit with the value of zero, which has no inverse, and consequently this method would be also be one-way. Similarly, functions for which finding their inverses involves computing a non-convergent series or non-convergent integral are other examples of classes of functions that may be used as one-way functions.

Another class of one-way functions involves computations that cause a loss of information or a discarding of selected pieces of information. Since some of the input information is lost in computing this class of one-way functions, the original input information (e.g., identifying information T) is difficult and may be impossible to recover. For example, a one-way function may be constructed by first performing a randomizing operation such as discarding random bits of information from the input, adding random bits of information to the input, and/or performing another randomizing operation to the input, and then another function may be applied to the information retained. Similarly, the same randomizing operations may be performed on the output of the function.

In an embodiment, a one-way hash function is used as method $\Phi_1$. A hash function is one that accepts as its input argument an arbitrarily long string of bits (or bytes) and produces a fixed-size output. In other words, a hash function maps a variable length input m to a fixed-sized output, $\Phi_1(m)$. Typical output sizes range from 128 to 512 bits, but can also be larger. An ideal hash function is a function $\Phi_1$ whose output is uniformly distributed in the following way. For example, suppose the output size of $\Phi_1$ is n bits. If the input m is chosen randomly, then for each of the $2^n$ possible outputs z, the probability that $\Phi_1(m)=z$ is $2^{-n}$. This is a definition of an ideal hash function.

A real hash function with output size n bits should have the property that probability of each of its $2^n$ possible outputs can be compared against the ideal probability of $2^{-n}$. The chi-square function on n−1 degrees of freedom is a useful way to measure the quality of a real hash function. One uses a chi-square on n−1 degrees because there are n bits of output. And then one can compute a confidence level that the real hash function is close to an ideal hash function. Some typical confidence levels could be 90%, 95%, 99%, 99.5% and 99.999% depending on the level of security desired. In an embodiment, the hash functions that are used are one-way. Other types of one-way functions or methods may be used in place of a hash function. In an embodiment, the hash functions that are used are one-way. Other types of one-way functions or methods may be used in place of a hash function.

Any of a number of hash functions may be used for $\Phi_1$. One possible hash function is SHA-256, designed by the National Security Agency and standardized by the NIST, [NIST_STANDARDS_1995]. The output size of SHA-256 is 256 bits. Other alternative hash functions are of the type that conforms to the standard SHA-1, which produces output values of 160 bits, and SHA-512, which produces output values of 512 bits, [NIST_STANDARDS_2001].

There are different methods $\Phi_1$ that may be used for hashing fingerprints and other kinds of input. As an alternative to biometric data, other types of input could be used. For example, the input to a hashing function could be a sequence of symbols such as a passcode or a registration code (that is different from the passcode or registration code that is produced). Different types of methods of hashing are appropriate for different sizes of codes, and different types of fingerprint information that is passed to the hash function. One method is to take two different fingerprints and apply the hash function SHA-256 to each print. For ease of explanation, denote the hash function SHA-256 as $\Phi_1$. Each application of $\Phi_1$ to a fingerprint produces an output value of 256 bits. With two fingerprints, these bits are concatenated together to create a 512-bit code, which may be called C.

Another method for $\Phi_1$ uses two different sections S and T of a single acquired fingerprint, and produce a 512-bit code, C, by concatenating $\Phi_1(S)$ and $\Phi_1(T)$. An enhancement of this method can be used to create codes larger than 512-bits. Divide one acquired fingerprint into n sections: $S_1, S_2, \ldots, S_n$. Then concatenate the bits $\Phi_1(S_1), \Phi_1(S_2), \ldots, \Phi_1(S_n)$. This creates a code C that is 256 n bits in length. For example, if the acquired fingerprint is divided into 10 sections, then this method would create a code with 2,560 bits. Any of the methods used as one-way functions for generating registration code R may also be used for generating passcodes or may be used at any of the other places in this application where a one-way function is useful. In another embodiment, method $\Phi_1$ could be a random number generator.

Setup portion 104 uses registration code R and a method $\Phi_2$, which may be a one-way function, to generate an initial passcode generator $G_1$. Initial passcode generator $G_1$ may be used for generating an initial passcode. A passcode generator, also known as a seed, can be a string of characters or other form of a code similar to registration code R or a passcode. Passcode generators may be stored securely by administrator 102 for use in verifying a passcode that is submitted by passcode device 101. The initial passcode generator $G_1$ may be generated according to the equation $\Phi_2(R)=G_1$. Method $\Phi_2$ (which also may be referred to as a generating method) may be the same as, or different from, method $\Phi_1$.

Using passcode generators, such as $G_1$, enables the identification of a person without having access to the user's identifying data, such as the user's biometric data (e.g., fingerprints) or social security number or other identifying data. For example, some citizens and organizations are concerned about the government and other institutions storing a person's biometric data. Using a passcode generator, such as $G_1$, an institution can identify a person with a unique registration or passcode, which is derived from his or her fingerprint, other biometric data, and/or other authentication data.

Request portion 106 requests access to a secure device. In an embodiment, request portion 106 generates a passcode, which may be used for requesting access to a secure entity. For example, request portion may use a method, $\Phi_3$, and a generator, $G_i$, for generating a passcode $P_i$. Method $\Phi_3$ may be a one-way method such as a one way function, similar to method $\Phi_2$. Method $\Phi_3$ (which may be referred to as a generating method) may be the same as or different from methods $\Phi_1$ and/or $\Phi_2$. For example, request portion 106 may compute a passcode using the equation, $\Phi_3(G_i)=P_i$. The index i is used to indicate the ith passcode $P_i$, which in an embodiment is generated by the ith request for a passcode. In an embodiment, each passcode, $P_i$, is generated by using a different generator $G_i$. In an embodiment, each new generator, $G_{i+1}$, may be generated from a prior generator, $G_i$, using a method f, according to the equation, $f(G_i)=G_{i+1}$, for example.

In embodiments that use a graphical (e.g. LCD) display for the registration code and/or passcode, the function $\Phi_3$ may be equal to D∘Φ where D is a display function and Φ is, for example, a one-way hash function. Here is an example of a display function D, titled code_to_alphanumeric_no_lO— implemented in the C programming language:

```
// Returns a, b, c, d, e, f, g, h, i, j, k, m, n, o, p, q, r, s, t, u, v, w, x, y, z,
0, 1, 2, 3, 4
// 5, 6, 7, 8, 9, A, B, C, D, E, F, G, H, I, J, K, L, M, N, P, Q, R, S, T, U,
V, X, Y, Z,
//
// Does not return little 'l' and capital 'O' : 60 distinct symbols
UNSIGN_8_BITS convert_alphanumeric_no_lO(UNSIGN_8_BITS c)
{
    int val = c % 60;
    if (val < 11) return ('a' + val);
    else if (val < 25) return ('m' + (val - 11) );
    else if (val < 35) return ('0' + (val - 25));
    else if (val < 49) return ('A' + (val - 35) );
    else return ('P' + (val - 49) );
}
int code_to_alphanumeric_no_lO(UNSIGN_8_BITS* p_alphanumeric, int length,
                UNSIGN_8_BITS* p_code)
{
    int k;
    for(k = 0; k < length; k++)
    {
        p_alphanumeric[k] = convert_alpha-
        numeric_no_lO(p_code[k] );
    }
    return 0;
}
```

In general, the output of $\Phi_3(G_i)$ is a sequence of bytes and each of these bytes may be a value ranging from 0 to 255. In embodiments where there is a graphical display of the registration and/or passcode, the display function D is helpful because some byte values have a graphical output that is difficult to read by a user, (letter O versus the number 0), unreadable such as an end of file character, or a character that is difficult for a person to reliably describe, such as '&', which some people do not know is called an ampersand. The primary purpose of the display function D is to convert unreadable or difficult-to-read byte values to readable byte values.

Setup 108, request for access 110, reply 112, and access to secure device 114 are different forms of communications in which passcode device 101 participates. Setup 108, request for access 110, and reply 112 are embodiments of the communications represented by the lines connecting passcode device 101, administrator 102, and secure entity 103 in FIG. 11B. In an embodiment, passcode device 101 may send registration code R to another entity, when sending setup 108. In an embodiment, passcode device 101 sends a user ID U with the registration code R to another entity or elsewhere as part of setup 108. Alternatively, passcode device 101 receives the user ID U from the other entity or from elsewhere. Request access 110 is a request for access to secure device 103. Request 110 may include sending passcode $P_i$, for example. In an embodiment, user ID U is also sent as part of request 110.

Reply 112 is a reply to request 110. Reply 112 may include a grant or a denial of request 110 for access to secure entity 103. In an embodiment, administrator 102 receives registration codes R from passcode device 101 as part of setup 108, and receives requests for access to a secure device from passcode device 101, as part of request 110. In an embodiment, administrator 102 may also grant or deny access to a user associated with passcode device 101, as part of reply 112. Access to secure device 114 are communications between passcode device 101 and secure entity 103. Access to secure entity 114 can be blocked from occurring or allowed to occur by administrator 102.

Administrator 102 includes setup portion 116, which uses registration code R received from passcode device 101, to generate the initial passcode generator $G_1$. In alternative embodiments, setup portion 116 may be located outside of administrator 102. Since administrator 102 may service several passcode devices 101 and/or several users, user ID U may be used to associate a registration code R, the generators $G_i$, and the passcodes generated with a passcode device 101 and/or a user U, which may be written as $R_U$ and $G_{Ui}$, respectively. In this notation, the index U distinguishes the registration code $R_U$ and generator $G_{U1}$ of user U from the registration code and generators of other users. Registration code $R_U$ denotes registration code R after having been associated with user U at the administrator's side.

Since administrator 102 may need to authenticate the passcode submitted by passcode device 101, administrator 102 may need to generate the same set of passcodes as passcode device 101 in order to perform the authentication. Administrator 102 may generate the passcodes generated by passcode device 101 by using the same methods (e.g., one-way functions such as one-way hash functions or random number generators) and generators as used by passcode device 101. Consequently, administrator 102 uses method $\Phi_{U2}$ to generate an initial passcode generator $G_{U1}$. Method $\Phi_{U2}$ may be the same for all U as long as the registration codes $R_U$ are different for each of the U's. In an embodiment, methods $\Phi_{U2}$ are in general different for each U. If methods $\Phi_{U2}$ are different, then the $R_U$'s do not need to necessarily be different so long as the resulting passcodes for different users are in general different. The passcodes of different users can be different if methods $\Phi_{U3}$ or passcode generators $G_{Ui}$ are different for different users, while the $G_{Ui}$'s will be different for different users if methods $\Phi_{U2}$ and/or $R_U$ are different.

Similar to passcode device 101, administrator 102 may generate the initial passcode generator $G_{U1}$ according to the equation $\Phi_{U2}(R_U)=G_{U1}$. In an embodiment, for a given authorized user U, $\Phi_{U2}$, $R_U$, and $G_{U1}$ are the same as $\Phi_2$, R, and $G_1$.

Administrator 102 also includes request portion 118. In alternative embodiments, request portion may be located outside of administrator 102. For example, request portion 118 may be stored and executed on a system having a database that stores information being accessed. Request portion 118 receives, via request 110, passcode $P_i$ and user ID U from request portion 106 of passcode device 101. Database 122 may be part of administrator 102, as illustrated in FIG. 1B, or may be located elsewhere. Database 122 may store current passcode generators and/or other user information. In an embodiment, based on user ID U, request portion 118 receives a passcode generator from database 122, and generates a passcode that is compared with the passcode $P_i$ received from the passcode device. The passcode $P_i$ generated is expected to be the same passcode that user U sent with the current request if user U is an authorized user.

For example, request portion 118 may use method $\Phi_{U3}$ and a passcode generator, $G_{Ui}$, for generating a passcode $P_{Ui}$. Method $\Phi_{U3}$ may be the same as or different from method $\Phi_{U2}$. For example, request portion computes a passcode using the equation, $\Phi_{U3}(G_{Ui})=P_{Ui}$. Each passcode, $P_{Ui}$, is generated by using a different passcode generator $G_{Ui}$. Each new passcode generator, $G_{Ui+1}$, may be generated from a prior passcode generator, $G_{Ui}$, using method $f_U$, according to the equation, $f_U(G_{Ui})=G_{Ui+1}$, for example. Request portion 118 compares passcode $P_{Ui}$ to passcode $P_i$, and if passcode $P_{Ui}$ and passcode $P_i$ are the same, authorization to access to secure entity 103 is granted from request portion 118 of administrator 102, via reply 112, to the user associated with passcode device 101.

Methods $\Phi_{U3}$ and $f_U$ may be the same for all U as long as the passcode generators $G_{Ui}$ and $G_{Ui+1}$ are different. In an embodiment, methods $\Phi_{U3}$ and $f_U$ are in general different for different U. In an embodiment, for a given authorized user U, $\Phi_{U3}$, $f_U$, $G_{Ui}$, and $G_{Ui+1}$ are the same as $\Phi_3$, f, $G_i$, and $G_{i+1}$, respectively, except that $\Phi_{U3}$, $G_{Ui}$, and $G_{Ui+1}$ are generated in association with administrator 102 and $\Phi_3$, f, $G_i$, and $G_{i+1}$ are generated at passcode device 101. Setup portion 116 and request portion 118 may be separate portions of code, such as objects, subroutines, functions, and/or methods. Setup portion 116 and request portion 118 may not be separate portions of code, but may be lines of code intermingled with one another and/or other parts of administrator 102.

Figure 1C:
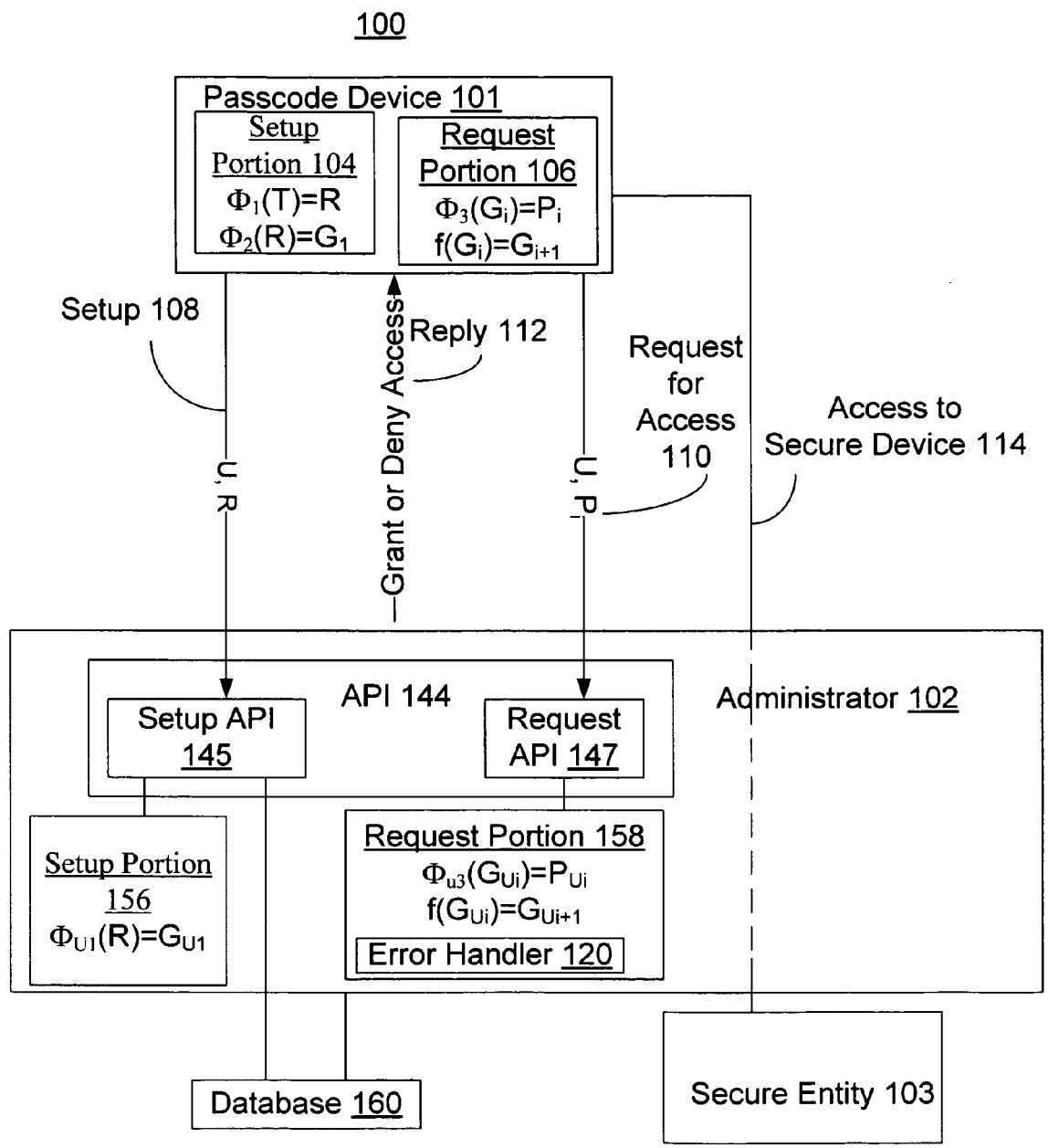
FIG. 1C shows a block diagram of an example of the system of FIG. 1A.

FIG. 1C shows one embodiment of system 100. In the embodiment of FIG. 1C, passcode device 101 includes setup portion 104 and request portion 106, similar to the embodiment of FIG. 1B. In the embodiment of FIG. 1C, system 100 includes setup 108, request for access 110, reply 112, and administrator 102. Administrator 102 includes API 144, which may include setup API 145, request API 147. Administrator 102 may also include setup portion 156, and request portion 158. As in FIG. 1B, in FIG. 1C system 100 also includes database 160 and secure entity 103. Request portion 158 may include error handler 120. In other embodiments of FIG. 1C, system 100 may not have all of the components listed above or may have other components instead of and/or in addition to those listed above.

Passcode device 101, administrator 102, and secure entity 103 were explained in conjunction with FIG. 1A. Setup portion 104 (of passcode device 101), request portion 106 (of passcode device 101), setup 108, request for access 110, reply 112, and request for access 110 were also explained above in conjunction with FIG. 1B. Setup portion 156, request portion 158, database 160 function in essentially the same manner as setup portion 116, request portion 118, database 122 (FIG. 1B). However, setup portion 156, request portion 158, database 160 are numbered differently from setup portion 116, request portion 118, database 122 (FIG. 1B), because their locations in FIG. 1C are different than in FIG. 1B, and consequently their operations may have differences that relate to their different locations.

In some applications (e.g., an electronic lock for a car), system 100 may not need a database, because the amount of information being stored is relatively small. Other applications, such as accessing a bank account, may have many users and may require the storing of information associated with system 100 in a database. Some institutions may not mind establishing a new database for storing information associated with system 100 when installing system 100. However, other institutions, such as banks, may already use one or more databases. Institutions that already have at least one database may not be interested in maintaining another separate database for the user information associated with system 100, and may prefer to store the user information associated with system 100 in their current database. API 144, setup API 145, and/or request API 147 may communicate with a database for storing and retrieving user information.

To explain API 144, in an embodiment, API 144 is located within administrator 102, and communicates with passcode device 101 and database 160. In an embodiment in which administrator 102 is a human (and in other embodiments), API 144 may be external to the rest of administrator 102. Setup API 145 is the interface through which the user, passcode device 101, or a human administrator setup and/or register new user. Request API 147 is the interface through which a user, passcode device 101, or a human administrator request access to secure entity 103. Setup API 145 and request API 147 may share the same fields for entering data or may use different fields. Similarly, setup API 145 and request API 147 may not be distinct modules, but may be different portions of code within administrator 102 and/or API 144 and may be parts of the same module. Alternatively, the lines of code that make setup API 145 and request API 147 may be intermingled with one another, and/or with the rest of administrator 102. Setup API 145 and request API 147 may be any combination of hardware and software. The software portion of setup API 145 and request API 147 (if present) may be written using any of a number of scripts and/or computer languages such as PHP, JSP, a web interface that calls JavaScript routines, C, Perl, TCL, Pascal, and/or Basic.

In an embodiment, setup API 145 and request API 147 may be capable of handling both clients that prefer to use pre-existing database, such as database 160, and those that prefer to use a newly established database, facilitating a quick integration of system 100 into a pre-existing system and thereby reducing the financial costs of integration. In an alternative embodiment, a different setup API 145 and/or request API 147 are used depending upon whether the customer intends on using their own database or allowing administrator 102 to setup a database.

To explain setup API 145 in conjunction setup portion 156, setup API 145 may cause user information, such as passcode generators $G_{Ui}$ to be stored in database 160. Setup API 145 may cause methods $\Phi_{U2}$ and/or $\Phi_{U3}$ to be stored within administrator 102 for use by setup portion 156. Methods $\Phi_{U2}$, $\Phi_{U3}$, and/or $f_U$ may also be stored within administrator 102 for use by setup portion 156.

Request portion 158 may contain proprietary executable code that receives a passcode from request API 147. Request portion 158 may determine whether passcode $P_i$ is valid or not.

Regarding database 160, database 160 may have existed prior to the installation of system 100, and may store a variety of different types of information, some of which may have not have any relationship to granting access to the secure entity 103. When configuring system 100 or when setting up a new user, if database 160 already exists and already has a records for the user of interest, system 100 may add a field to the record for a user ID U and for a passcode generator $G_{Ui}$. In an alternative embodiment, database 160 is within administrator 102, and is installed with and/or after administrator 102.

Putting together the above discussion of API 144, setup portion 156 and request portion 158, and database 160, a registration code R may be based upon (e.g., copied from or received as) output from passcode device 101 and optionally may also be based on other user information that is entered into the setup API 145. Setup API 145 calls setup portion 156 and passes registration code R as an argument, where registration code R is received by setup portion 156.

In an embodiment, setup portion 156 determines if registration code R is valid, and sends a valid or invalid message back to setup API 145. The determination of whether registration code R is valid may be a determination as to whether registration code R fits a particular format. If administrator 102 stores a copy of the user information from which registration code was derived, then the determination as to whether registration code is valid may include generating the registration code at registration portion 156, comparing the generated registration code with the received registration code. Determining whether registration code R is valid may involve verifying that the user associated with registration code R exists, determining whether user ID U is valid, and/or verifying other user information that registration portion 156 has access to. Determining whether registration code R is valid may involve administrator 102 sending a communication to passcode device 101 or the associated user confirming that the registration code was sent. If valid, the setup API 145 also sends a passcode generator $G_{Ui}$ (generated from registration code R) and may optionally send other user information, such as the user ID U, to database 160.

When a user would like to access secure entity 103, a passcode $P_i$ is entered into, transmitted to, and/or received by request API 147 based on output from passcode device 101. Request API 147 calls request portion 158, using passcode $P_i$ as an argument. User ID U may be encoded within passcode $P_i$, and request portion 158 may extract user ID U from passcode $P_i$. Request portion 158 may return user ID U to request API 147. If passcode $P_i$ is invalid, request portion 158 may return an invalid user ID U. Alternatively, instead of request portion 158 extracting the user ID U from passcode $P_i$, the user may enter user ID U into request API 147, or request API 147 may receive user ID U from passcode device 101.

Administrator 102 uses user ID U as a database index for the purpose of retrieving passcode generator $G_{Ui}$ from the database 160. If user ID U is an invalid index, then administrator 102 sends an invalid message to request API 147. If user ID U is a valid index, then the administrator 102 sends passcode generator $G_{Ui}$ to request API 147. Request API 147 calls request portion 158, and sends two arguments, passcode $P_i$ and passcode generator $G_{Ui}$, which are received by request portion 158. Request portion 158 determines whether passcode $P_i$ and passcode $G_{Ui}$ match. If passcode $P_i$ and passcode $G_{Ui}$ match, then request portion 158 returns a valid message and the updated passcode generator $G_{Ui+1}=f(G_{Ui})$ to the request API 147. Administrator 102 stores passcode generator $G_i$ or an updated version of passcode generator $G_{Ui+1}$ in database 160, such that passcode generator $G_i$ or its updated version is indexed by user ID U. However, if passcode $P_i$ and passcode generator $G_{Ui}$ do not match, the request portion 158 returns an invalid message to request API 147. Then request API 147 may send an invalid message to the user U, a human administrator, and/or passcode device 101.

FIG. 2 shows an example of an embodiment of a secure system 200. Secure system 200 includes passcode device 202, computer 204 having input system 206 and output system 208. Secure system 200 also includes system 210, network 212, system 214, system 216, system 218, and system 220. In other embodiments secure system 200 may not have all of the components listed above or may have other components instead of and/or in addition to those listed above.

Secure system 200 illustrates some of the variations of the manners of implementing system 100. Passcode device 202 is one embodiment of passcode device 101. Passcode device 202 is capable of being plugged into and communicating with computer 204 or with other systems via computer 204. Passcode device 202 also may communicate wirelessly with computer 204. A user may use input system 206 and output system 208 to communicate with passcode device 101.

Computer 204 is directly connected to system 210, and is connected, via network 212, to system 214, system 216, and system 218, which is connected to system 220. Network 212 may be any one or any combination of one or more Local Area Networks (LANs), Wide Area Networks (WANs), wireless networks, telephones networks, and/or other networks. System 218 may be directly connected to system 220 or connected via a LAN to system 220. Administrator 102 may be any of, a part of any of, or any combination of any of computer 204, system 210, network 212, system 214, system 216, system 218, and/or system 220. Secure entity 103 and may be any of, a part of any of, or any combination of any of system 210, network 212, system 214, system 216, system 218, and/or system 220. For example, administrator 102 may be located on system 214, and secure entity 103 may be located on system 216. As another example, administrator 102 may be located on computer 204, and secure entity 103 may be located on system 210, 214, system 216, system 218, system 220, and/or network 212. As yet another example, administrator 102 and secure entity 103 may both be located on system 216 or may both be located on system 210. As another example, system 218 may be administrator 102, and system 220 may include secure entity 103.

Figure 2A:
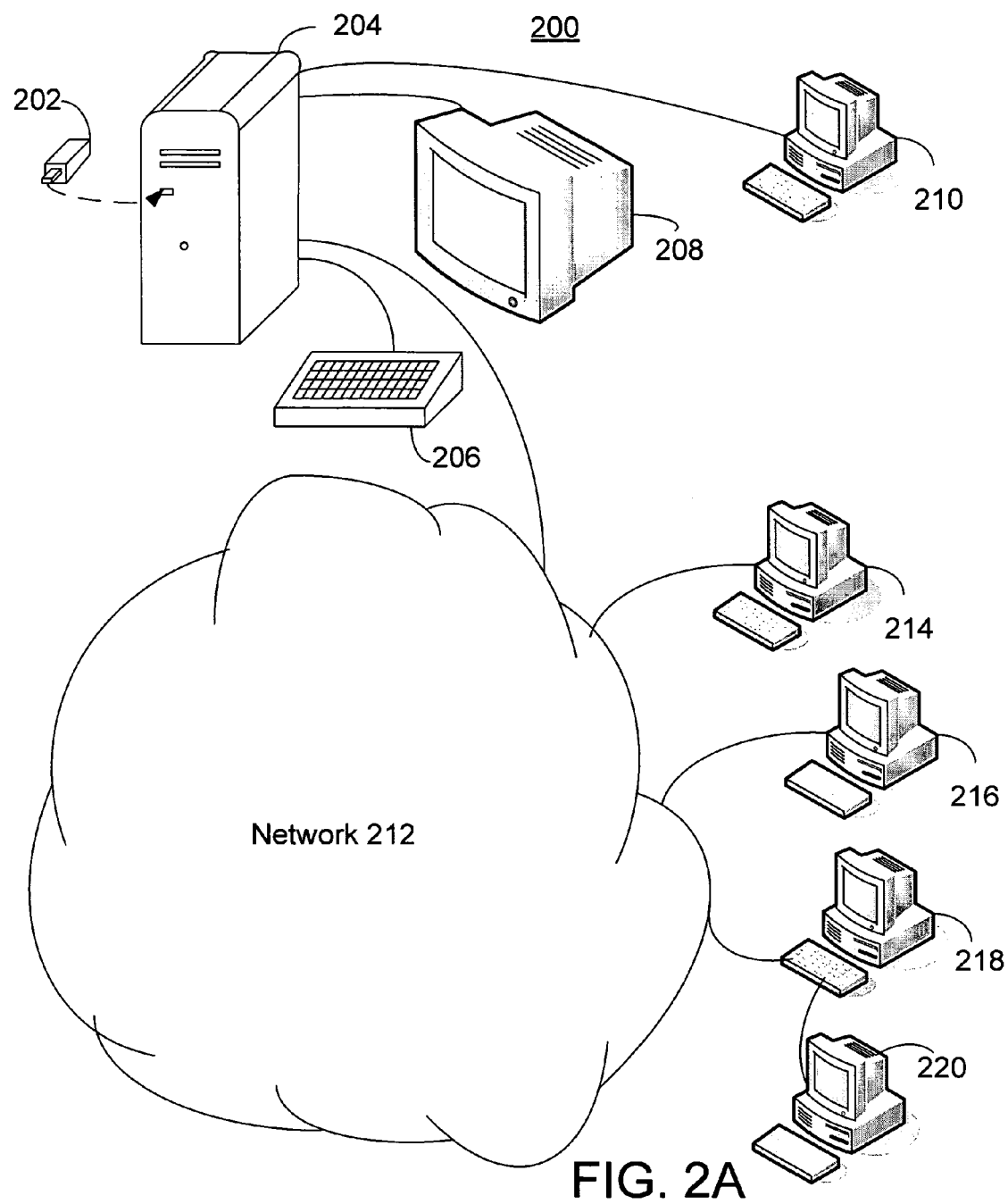
FIG. 2A shows a block diagram of an example of the system of FIG. 1A.
Figure 2B:
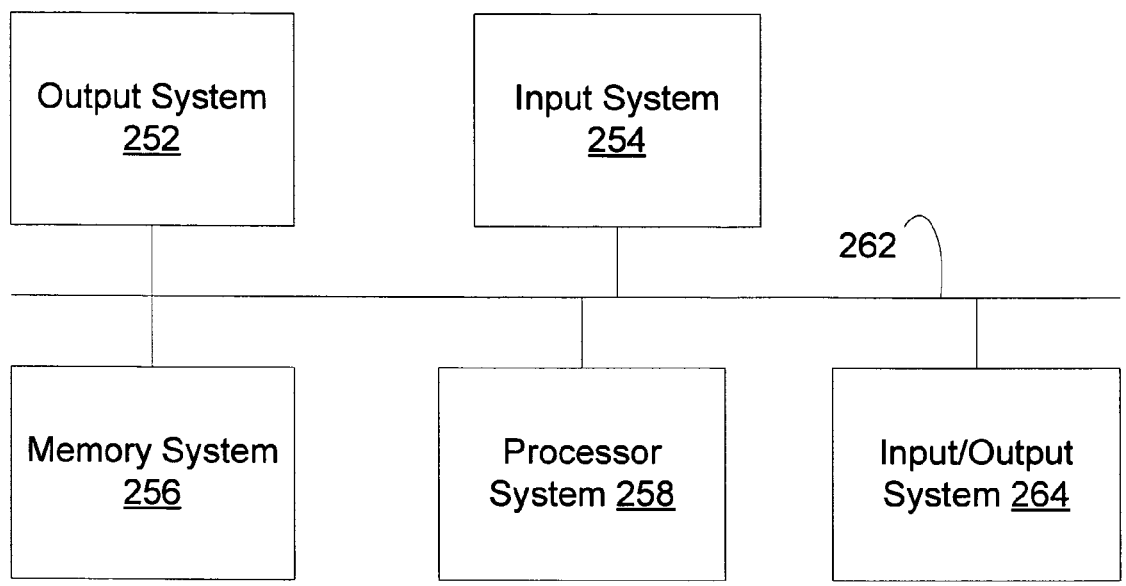
FIG. 2B shows a block diagram of an example of computer system, which may be used as any of the system of FIG. 2A and/or for any of the blocks in FIGS. 1A-C.

FIG. 2B shows a block diagram of a computer system 250 used in system 100. Computer system 250 may include output system 252, input system 254, memory system 256, processor system 258, communications system 262, and input/output device 264. In other embodiments, computer system 250 may not include all of the components listed above or include other components in addition to and/or instead of those listed above.

Computer system 250 is an example of a system that may be used for any one of, any combination of, or all of computer 204, system 210, system 214, system 216, system 218, and/or system 220.

Output system 252 may include any one of, some of, any combination of, or all of a monitor system, a handheld display system, a printer system, a speaker system, a connection or interface system to a sound system, an interface system to peripheral devices and/or a connection and/or interface system to a computer system, an intranet, and/or an internet, for example.

Input system 254 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for example.

Memory system 256 may include, for example, any one of, some of, any combination of, or all of a long term storage system, such as a hard drive; a short term storage system, such as random access memory; a removable storage system, such as a floppy drive, jump drive or other removable drive; and/or flash memory. Memory system 256 may include one or more machine-readable mediums that may store a variety of different types of information.

The term machine-readable medium is used to refer to any medium capable carrying information that is readable by a machine. One example of a machine-readable medium is a computer-readable medium. Another example of a machine-readable medium is paper having holes that are detected that trigger different mechanical, electrical, and/or logic responses. For example, embedded software is stored on a machine-readable medium. The term machine-readable medium also includes mediums that carry information while the information is in transit from one location to another, such as copper wire, air, water, and/or optical fiber. Software versions of any of the components of FIGS. 1A-C may be stored on machine-readable mediums.

Processor system 258 may include any one of, some of, any combination of, or all of multiple parallel processors, a single processor, a system of processors having one or more central processors, and/or one or more specialized processors dedicated to specific tasks.

Communications system 262 communicatively links output system 252, input system 254, memory system 256, processor system 258, and/or input/output system 264 to each other. Communications system 262 may include machine-readable media such as any one of, some of, any combination of, or all of electrical cables, fiber optic cables, long term and/or short term storage (e.g., for sharing data) and/or means of sending signals through air (e.g., wireless communications), for example. Some examples of means of sending signals through air include systems for transmitting electromagnetic waves such as infrared and/or radio waves and/or systems for sending sound waves.

Input/output system 264 may include devices that have the dual function as input and output devices. For example, input/output system 264 may include one or more touch sensitive display screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 264 is optional, and may be used in addition to or in place of output system 252 and/or input device 254.

Figure 3A:
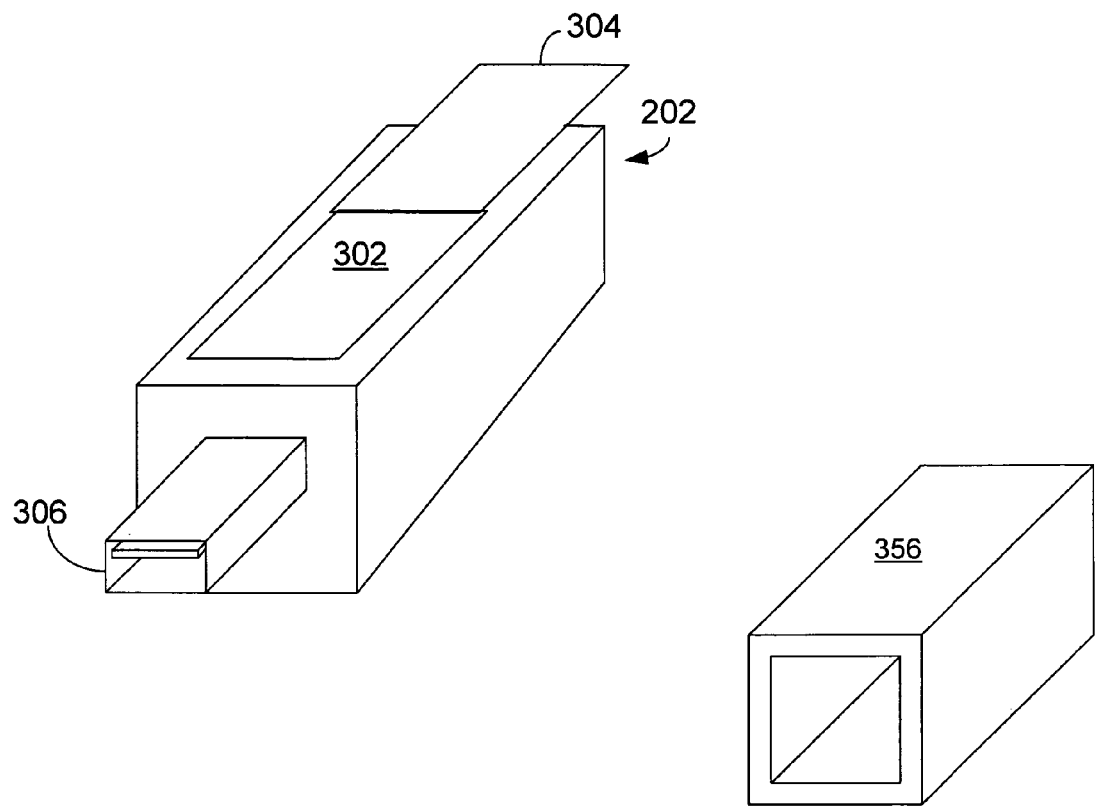
FIG. 3A shows an example of a passcode device.

FIG. 3A shows one example of a passcode device 202. Passcode device 202 includes acquisition mechanism 302, cover 304, and interface 306. In other embodiments, passcode device 202 may not have all of the components listed above or may have other components instead of and/or in addition to those listed above.

Acquisition mechanism 302 may be a mechanism of acquiring fingerprints. Cover 304 may be a cover for covering acquisition mechanism 302, and for protecting acquisition mechanism 302 when acquisition mechanism 302 is not in use. Cover 304 may swing open, slide open, and/or snap off and on. Interface 306 is for connecting with an electronic device, such as a computer. Interface 306 may be a USB port, an RS 232 connection, a wireless connection using RFID, a serial port or any of a number of other types of connections.

Figure 3B:
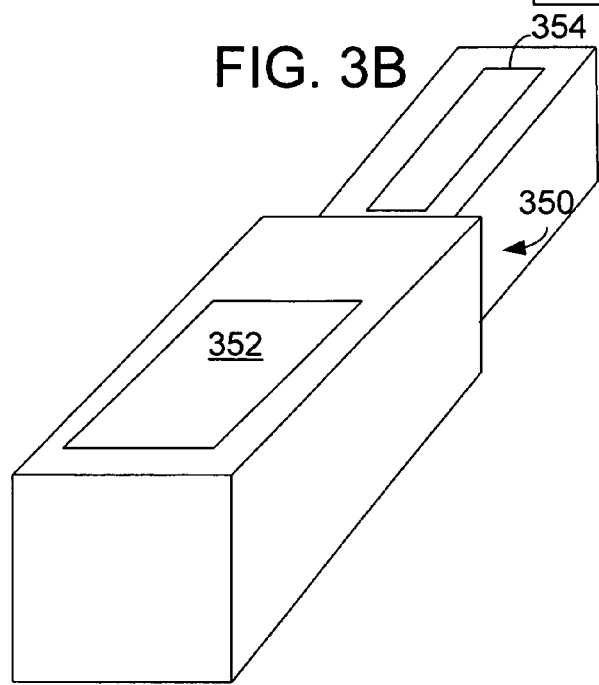
FIG. 3B shows an example of a passcode device.

FIG. 3B shows an example of a passcode device 350. Passcode device 350 includes display 352, acquisition mechanism 354, and cover 356. In other embodiments passcode device 350 may not have all of the components listed above or may have other components instead of and/or in addition to those listed above.

Passcode device 350 is an embodiment of passcode device 101. Passcode device 350 may be used instead of passcode device 202 in FIG. 2A. Display 352 displays passcodes and/or registration numbers. Display 352 is an interface with which the user interacts with passcode device 352, and may be used for transferring the passcode or registration code to an administrator. Passcode device 350 may also include a transmitter for transmitting the passcode or registration code via radio waves, light pulses, and/or sound, for example. Acquisition mechanism 354 maybe for acquiring fingerprints and/or images of other parts of the body of the user. The user may swipe her or his finger over acquisition mechanism 354. In response, display 352 may display a passcode that is only good for one use. The user reads the passcode or registration code and causes the passcode and/or registration code to be submitted to an administrator. Cover 356 slides over the portion of passcode device 350 having acquisition mechanism 354 to protect acquisition mechanism 354 from damage when not in use.

FIG. 4 shows an example of a passcode device 400. Passcode device 400 includes display 402, keypad 404, and acquisition mechanism 406. In other embodiments passcode device 400 may not have all of the components listed above or may have other components instead of and/or in addition to those listed above.

Passcode device 400 is an embodiment of passcode device 101, which may be used instead of passcode device 202 in FIG. 2A. Display 402 may display passcodes, registration numbers, status information, instructions, replies to commands, for example. Passcode device 400 may also include a transmitter for transmitting the passcode or registration code via radio waves, light pulses, and/or sound, for example. Keypad 404 is for entering user information and commands, for example. Acquisition mechanism 406 maybe for acquiring fingerprints and/or images of other parts of the body of the user. Having both keypad 404 and acquisition mechanism 406 allows passcode device 400 to be configured to require that the user enter identifying information, such as social security number and birthday, in addition to the user information acquired via acquisition mechanism 406.

FIG. 5A shows an example of an embodiment of passcode device 500. Passcode device 500 includes display 502, keypad 504, acquisition mechanism 506, key 508, and car 510. In other embodiments passcode device 500 may not have all of the components listed above or may have other components instead of and/or in addition to those listed above.

Passcode device 500 is an embodiment of passcode device 101. Display 502 may display passcodes, registration numbers, status information, instructions, replies to commands, for example. Keypad 504 is for entering user information and commands, for example. Acquisition mechanism 506 may be for acquiring fingerprints and/or images of other parts of the body of the user. Key 508 may be used as an alternative way of unlocking car 510. The user enters user information via acquisition mechanism 506, and then may choose a particular action or command such as open the driver's door, open all of the doors, open the trunk, lock the driver's door, and/or lock all of the doors.

Any one of, or any combination of, passcode devices 350, 400, and 500 maybe used in place of, or in addition to, passcode device 202 within system 200, for example. Passcode devices 202, 350, 400, and 500 are just a few example of the many embodiments of passcode device 101.

Figure 5B:
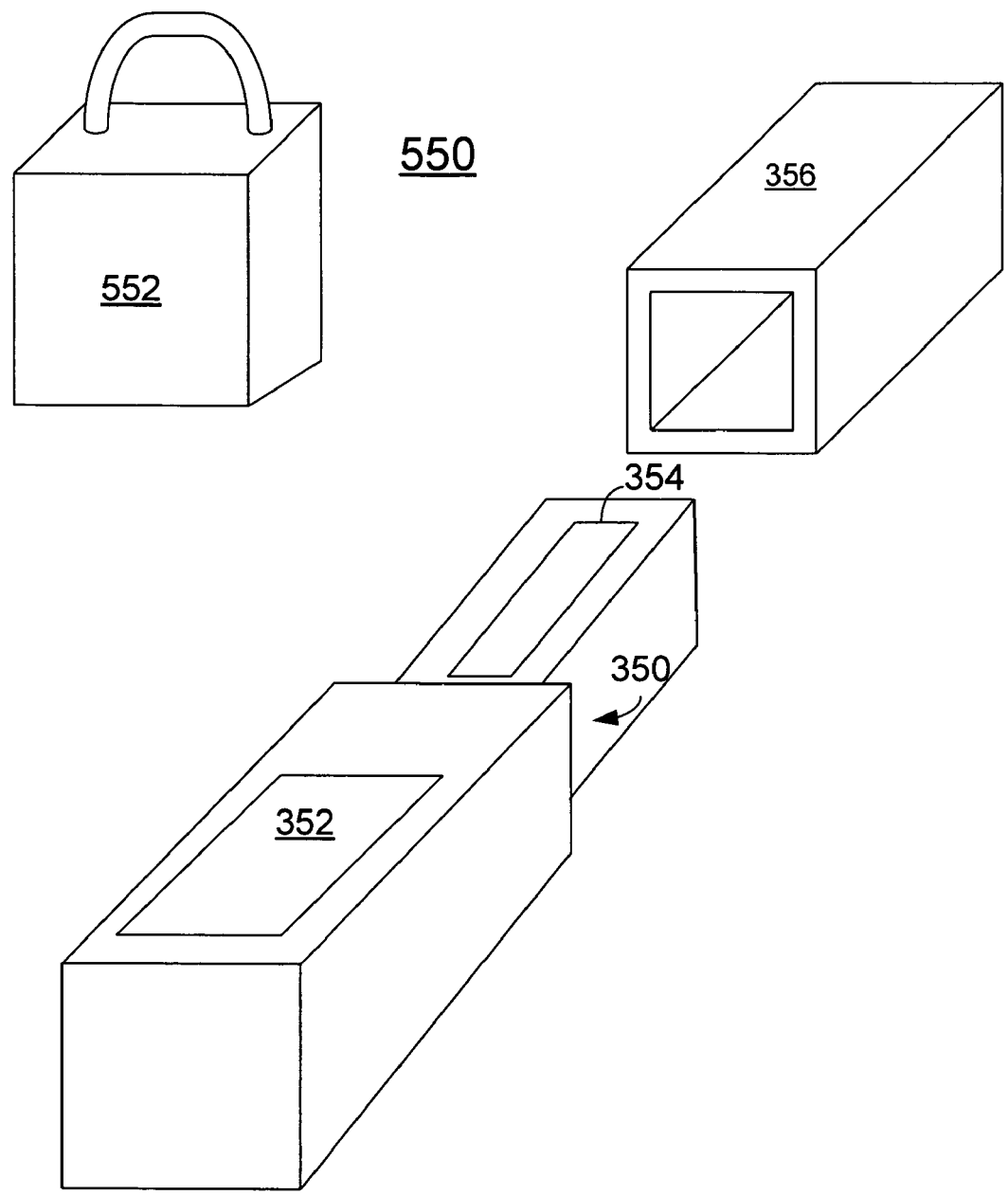
FIG. 5B shows an example of the system of FIG. 1A.

FIG. 5B shows an example of a system 550. System 550 includes at least passcode device 350 and electromechanical lock 552. As in FIG. 3B, passcode device 350 includes display 352, acquisition mechanism 354, and cover 356. In other embodiments passcode device 350 may not have all of the components listed above or may have other components instead of and/or in addition to those listed above.

Passcode device 350 and its components were described in FIG. 3B. In system 550, passcode device 350 opens electromechanical lock 552. In an embodiment, administrator 102 is located within electromechanical lock 552. Passcode device 350 may communicate with electromechanical lock 552 by sending electromagnetic signals that include the passcode to electromechanical lock 552. If the passcode is sent via electromagnetic signals, then display 352 is unnecessary and may not be included. Alternatively, electromechanical lock may include a key pad or other means for manually entering the passcode read off of display 352.

Figure 6:
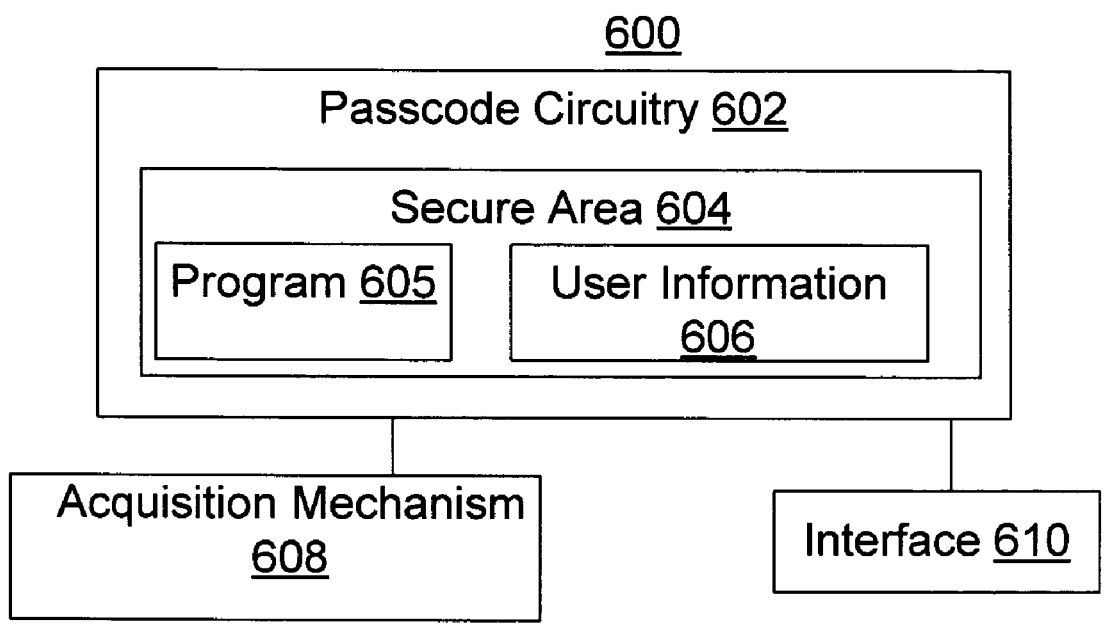
FIG. 6 shows a block diagram of a circuit of an example of a passcode device.

FIG. 6 shows a block diagram of a circuit of an embodiment of the passcode device 101. Passcode device 101 may include passcode circuitry 602, which may include secure area 604, program 605, and user information 606. Passcode device 101 may also include acquisition mechanism 608 and interface 610. In other embodiments circuit 600 may not have all of the components listed above or may have other components instead of and/or in addition to those listed above.

Passcode circuitry 602 generates passcodes $P_i$, registration codes R, passcode generators $G_i$ or $G_{Ui}$, and communicates with administrator 102. Passcode circuitry 602 authenticates information acquired from the user and decides whether to generate a passcode, based on the information. Passcode circuitry 602 may implement setup portion 104 request portion 106. Passcode circuitry 602 may include a processor chip. Alternatively, passcode circuitry 602 may send instructions to be processed by a processor associated with computer 204 (FIG. 2) and/or include specialized logic circuits for performing specific functions.

Passcode circuitry 602 may execute software instructions or perform similar functions, such as acquiring user information which may include a fingerprint (or other user information) from a sensor, matching acquired user information (e.g., an acquired fingerprint) against a stored user information extracted form other user information (e.g., fingerprint information extracted from a fingerprint), sending communication and control commands to a display, and/or encrypting the registration code R and transmitting the encrypted registration code R to the administrator 102 when the user and administrator 102 are not in the same physical location. By including a processor or an equivalent specialized logic circuit as part of passcode circuitry 602 in passcode device 101 the security is enhanced, because external processors are given fewer chances to inspect the contents of passcode device 101.

Alternatively, passcode circuitry 602 may only store software instructions that are run by an external processor, and the external processor gives instructions to cause the acquisition of user information, the encryption of user information, and/or the generation of the passcode, for example. Alternatively, a specialized logic circuit is included in passcode circuitry 602 that carries out the functions that the software causes the processors to perform. Passcode circuitry 602 may include memory.

Secure area 604 may be a portion of passcode circuitry 602 that uses embedded software. Secure area 604 may be memory that is onboard, or partially onboard, passcode circuitry 602. In some embodiments, the secure area 604 includes at least some memory that is onboard passcode circuitry 602. For example, in an embodiment in which passcode circuitry 602 includes a processor chip, secure area 604 may include cache associated with the process and/or other memory onboard the processor chip. For example, secure area 604 may store fingerprint templates, details of fingerprints, and/or copies of images of fingerprints on secure area 604. Some of secure area 604 may be non-volatile. The use of non-volatile memory enables the device to permanently store code generation information, user information (such as fingerprint information), executable code, and/or registration codes, for example.

In yet another embodiment, user information is used to generate registration code R, passcode generator $G_i$, and/or passcodes $P_i$ within secure area 604. Secure area 604 may store method f, method $\Phi_1$, method $\Phi_2$, and/or method $\Phi_3$. The use of fingerprints or other user information to create passcodes within secure area 604 or the use of fingerprints or other user information instead of passcodes within a secure area eliminates or reduces the need to memorize and store passcodes in an unsecure system.

Program 605 is executed by passcode circuitry 602. Program 605 may be the embedded software that runs within secure area 604. Program 605 is an example of an executable program that may stored in secure area 604. In an embodiment, there is no operating system on passcode device 101. In an alternative embodiment, there is an operating system. By executing program 605 (e.g., software for handling fingerprints or other user data) in a secure embedded device, the fingerprints are less susceptible to theft; the fingerprints are not transmitted to the unsecure device, nor is there any need to have encrypted templates of the fingerprints transmitted to an insecure device.

User information 606 may also be stored in secure area 604. User information 606 may include, or may be information derived from, any of the forms for user information and identifying information discussed above (e.g., fingerprints, iris scans, etc.), registration code R, method f, method $\Phi_1$, method $\Phi_2$, and/or method $\Phi_3$, and/or passcode generator $G_i$. Storing passcode generator $G_i$ in secure area 604 may facilitate quickly generating a one-time passcode, because the user does not need to wait for passcode generator $G_i$ to be generated.

The security of the passcode circuitry 602 may be enhanced by any one of, any combination or of, or all of (1) the use of embedded software, such as program 605, (2) the lack of an operating system, and (3) secure area 604 being at least part of a self-contained device not connected to a computer or the internet. For example, the unit that includes secure area 604 may contain its own processor as passcode circuitry 602. In an embodiment, the secure area 604 may not have any of these security enhancing features.

Acquisition mechanism 608 acquires information that is used by passcode circuitry 602 during the process of generating passcodes. Although not necessary, in some embodiments, acquisition mechanism 608 and passcode circuitry 602 could be integrated into a single chip. Alternatively, acquisition mechanism 608 and passcode circuitry 602 may be two separate chips. The user information acquired by acquisition mechanism 608 or user information derived from user information acquired by acquisition mechanism 608 may be stored in secure area 604. Acquisition mechanism 608 may acquire information that is used to identify a user. The information acquired by acquisition mechanism 608 may be used by passcode circuitry 602 for authenticating or identifying a user as a prerequisite for granting a passcode. For example, acquisition mechanism 608 may acquire fingerprints, details of fingerprints, copies of images of fingerprints, and/or other user information. Acquisition mechanism 608 may include a fingerprint sensor that enables passcode device 101 to scan fingerprints. Acquisition mechanism 608 may include a area sensor or a sweep sensor, for example. In an embodiment, acquisition mechanism 608 is capable of acquiring fingerprints and authenticating a newly acquired fingerprint.

In an embodiment, interface 610 is a display, such as display 352 (FIG. 3), display 402 (FIG. 4), and display 502 (FIG. 5A). In another embodiment, interface 610 interfaces with hardware associated with administrator 102 and/or secure entity 103. Passcode circuitry 602 sends instructions and/or other signals, via interface 610 to administrator 102 and/or secure entity 103 or to hardware associated with secure entity 103. Interface 610 may draw power from hardware associated with secure entity 103, which is used to power the operations of passcode device 101. Optionally, for example, interface 610 may be a USB port, serial port, a parallel port, and/or other connection.

Figure 7:
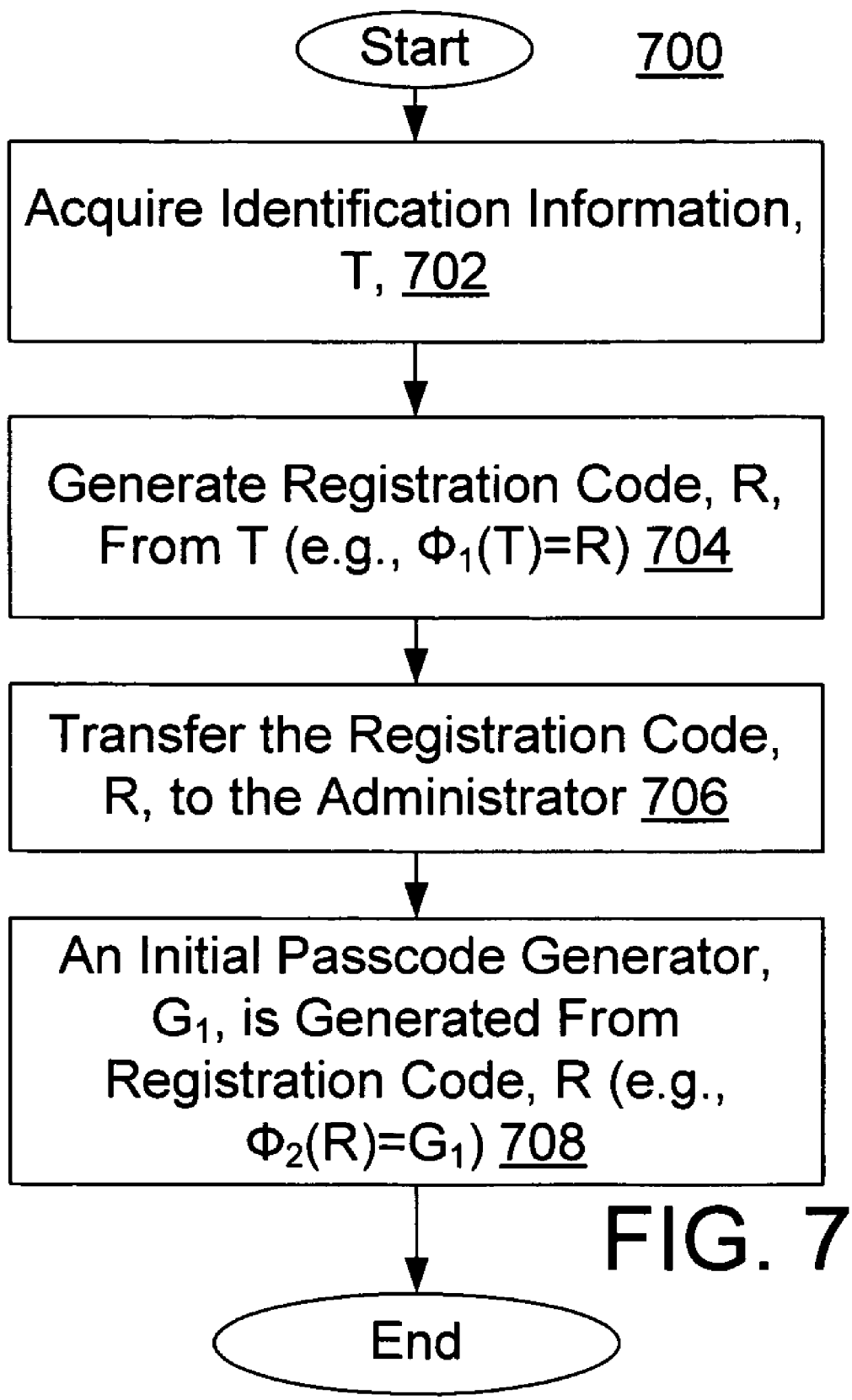
FIG. 7 shows a flowchart of an example of a method for setting up a passcode device for use by a particular user.

FIG. 7 shows a flowchart of, and example of, a method for setting up passcode device 101. During step 702, identifying information T is acquired by passcode device 101. For example one or more fingerprints, one or more images of the face, one or more images of eyes, or other pieces of identifying information T are acquired Optionally, information may be extracted from the identifying information. Optionally, identifying information T is also acquired by administrator 102. For example, administrator 102 may be associated with a bank, and the bank may require that the user visit the bank so that the identifying information T (e.g., fingerprints) can be acquired in person. During step 704, one or more unique registration codes R are generated from the one or more of the fingerprints, which may be generated according to the equation $\Phi_1(T)=R$. In an embodiment, during step 704, in the secure area 604 of the passcode device 101, fingerprint information obtained from the user is passed to method $\Phi_1$, which may be a one-way function or another method of encoding that generates a registration code, R.

During step 706, registration code R is securely given to administrator 102. Registration code R is created during step 704, and securely given to administrator 102 during step 706. The registration code R may be given to administrator 102 in the same physical place, such as at a bank, or registration code R may be mailed or electronically transmitted to administrator 102 if the setup is accomplished remotely. In some applications, registration code R may be encrypted first and then electronically transmitted or sent by mail. In the embodiment in which administrator 102 is associated with an entity that has acquired identifying information T, administrator 102 causes the identifying information to be authenticated, thereby verifying that the user is legitimate. Optionally, registration code R is stored and indexed by administrator 102 according to user ID U, as $R_U$. Alternatively, even if identifying information T is not collected by administrator 102, other information may be checked to determine the validity of registration code R. For example, other identifying information may be sent with registration code R or the format of registration code R may checked to determine whether registration code R is valid.

During step 708, an initial passcode generator $G_1$ is created and stored in flash memory, a cache, or other memory of the processor contained in the secure area 604 (FIG. 6) of passcode device 101. Initial passcode generator $G_1$ may be created according to equation $\Phi_2(R)=G_1$. Initial passcode generator $G_1$ may then be stored for later use in generating an initial passcode $P_1$ according to $P_1=\Phi_3(G_1)$. During this later use of initial passcode generator $G_1$ after generating passcode $P_1$a, passcode $P_1$ is subsequently transmitted to the host (e.g., administrator 102) for authentication. In this embodiment, passcode $P_1$ is not stored at passcode device 101, but is created just prior to being used and then discarded just after being used to reduce the chance of passcode $P_1$ being stolen. In an alternative embodiment, passcode $P_1$ can be generated immediately after generating passcode generator $G_1$ and then passcode $P_1$ can also be stored in secure area 604 of the processor to reduce execution time at passcode device 101.

Similarly, at administrator 102, the initial passcode generator $G_1$ is created and stored. Optionally, as part of storing initial passcode generator $G_1$, initial passcode generator $G_1$ is indexed according to a user ID U as $G_{U1}$. Similarly, each subsequent passcode generator $G_i$ may be stored and indexed according to user ID U, as $G_{Ui}$. In this embodiment, passcode $P_1$ is not stored at admiistrator 102, but is created just prior to being used and then discarded just after being used to reduce the chance of passcode $P_1$ being stolen. In an alternative embodiment, passcode $P_1$ can be generated at administrator 102 immediately after generating passcode generator $G_1$ and then passcode $P_1$ can also be stored in database 122 or 160 to reduce execution time at administrator 102. In other embodiments, method 700 may not have all of the steps listed above or may have other steps instead of and/or in addition to those listed above. Additionally the steps of method 700 may not be distinct steps.

Figure 8:
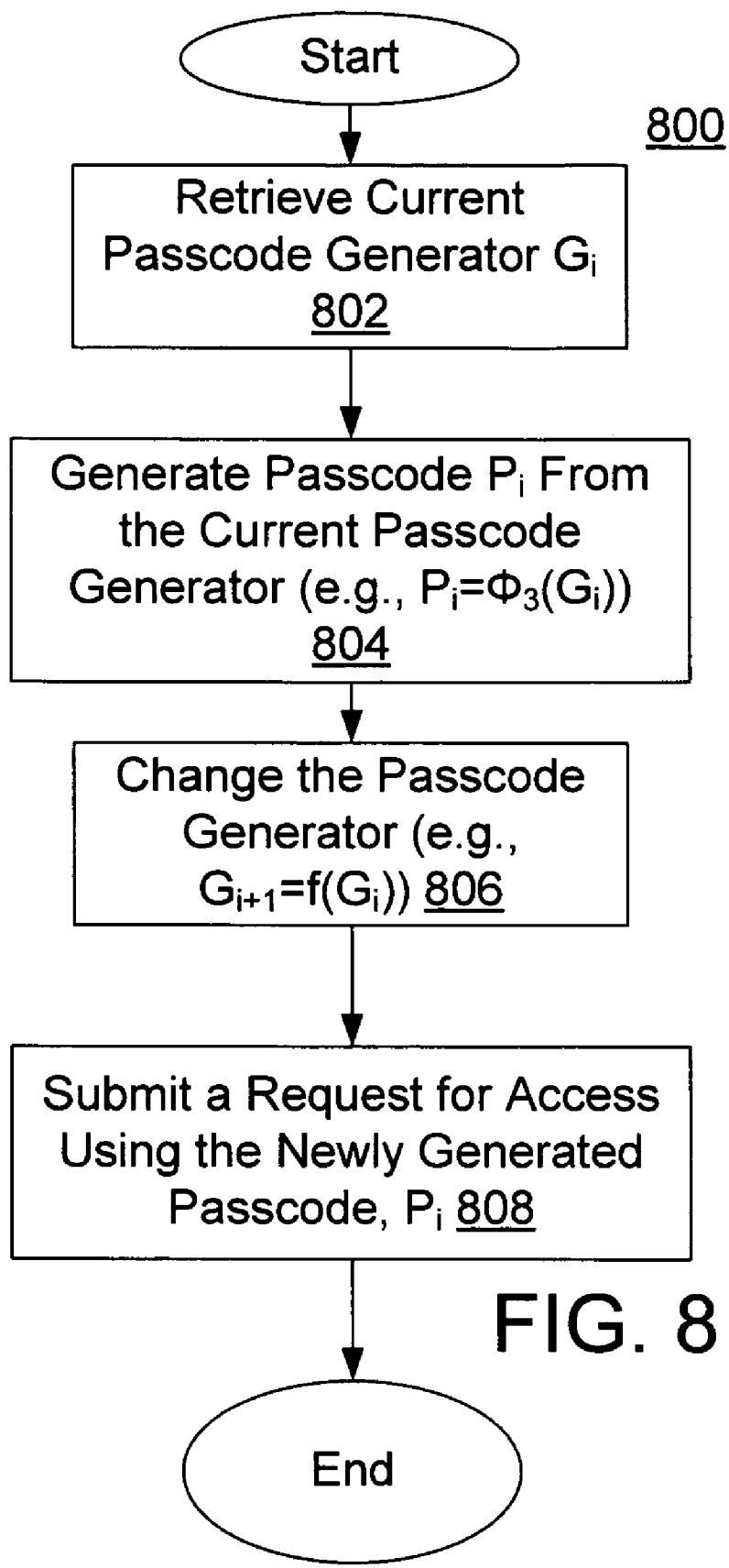
FIG. 8 shows a flowchart of an example of a method of requesting access to a secure entity.

FIG. 8 shows a flowchart of an example of a method 800 of generating a passcode. In step 802, the passcode generator $G_i$ is retrieved from a secure area 604 (FIG. 6). In the notation of this specification, if this is the first time passcode device 101 is being used after registration, the index i is equal to 1, passcode generator $G_i$ is the initial passcode generator $G_1$. In step 804, a method $\Phi_3$ is applied to passcode generator $G_i$, denoted as $\Phi_3(G_i)$, to create passcode $P_i$. In other words, $P_i=\Phi_3(G_i)$.

In step 806, the passcode generator $G_i$ is changed to a new value $G_{i+1}$, where $G_{i+1}$ is set equal to the new value $f(G_i)$. There are an infinite number of functions that f could be. The method f may be referred to as a perturbing method (e.g., a perturbing function). One possible perturbing method f could add $\Phi_3(G_i)$ to $G_i$. Another possible perturbing function could be $f(G_i)=\Phi_3(G_i+\Phi_3(G_i))$. More generally, the perturbing function could be $f(G_i)=(\Phi(G_i)*G_i)$ or $f(G_i)=\Phi(G_i*\Phi(G_i))$, where "*" may be any operator. For example, "*" may be binary operators such as +, −, OR, NOR AND, NAND, XOR, NOT(XOR). Another possible perturbing method f could consider passcode generator $G_i$ as a number and add 1. Another possible perturbing method f could increase passcode generator $G_i$ by 2. Another possible perturbing method f could add 1 to passcode generator $G_i$ and permute the order of the symbols in passcode $G_i$ using some randomly chosen permutation. Even another possible perturbing method f could add 1 to passcode generator $G_i$, and then permute the bits in passcode generator $G_i$. Passcode generator $G_i$ could be used as a seed for a random number generator, which is used as f to generate $G_{i+1}$. Steps 804 and 806 may be performed concurrently or in any order with respect to one another. Step 806 may be performed at anytime after step 802.

In step 808, a passcode $P_i$ (e.g., a one time passcode) is either transmitted to a display or submitted directly to administrator 102. During transmission, in some cases $P_i$ can be encrypted for additional security, for example in a wireless transmission. There are many different methods for transmitting the passcode $P_i$ to the administrator 102. In one method, passcode $P_i$ can be displayed to administrator 102 (e.g. if administrator 102 is a human being or if administrator 102 includes a scanner that can scan the display) when the user is in the same physical location as administrator 102. In a second method, the user may transmit passcode $P_i$ over the phone (e.g., via a phone call and human voice or via a modem and an electronic signal). In a third method, the user may submit the passcode $P_i$ using the Internet. The user may submit the passcode $P_i$ by other electronic means such as a fax machine or an ATM machine. Step 808 may be performed anytime after step 804. Steps 806 and 808 may be performed concurrently or in any order with respect to one another. In other embodiments method 800 may not have all of the steps listed above or may have other steps instead of and/or in addition to those listed above. Additionally the steps of method 800 may not be distinct steps.

Figure 9:
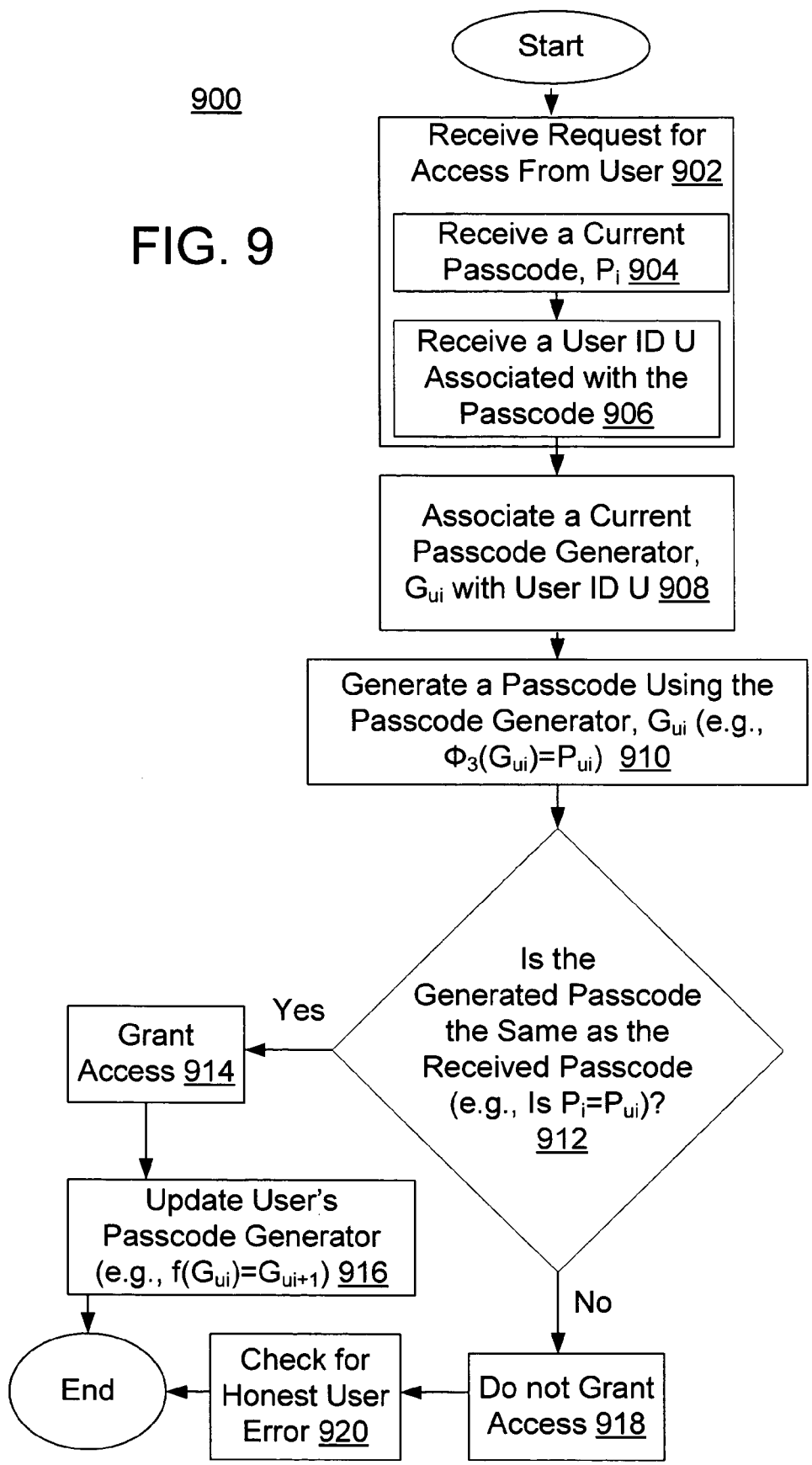
FIG. 9 shows a flowchart of an example of a method of handling a request for access to a secure entity.

FIG. 9 shows a flowchart of a method 900 of authenticating a passcode $P_i$. Method 900 may be performed in response to step 808 of method 800 (FIG. 8). In step 902, administrator 102 enters or receives passcode $P_i$ from the user. In an embodiment in which administrator 102 causes passcode generator $G_i$ to be indexed according to user ID U, step 902 may include at least two parts, which are step 904 and 906. In step 904, passcode $P_i$ is received, and in step 906 user ID U is received. User ID U and passcode $P_i$ may be sent as two separate sequences of bits. Alternatively, user ID U and passcode $P_i$ may be sent as one sequence of bits in which user ID U is encoded within passcode $P_i$. If User ID is encoded within passcode $P_i$, then receiving user ID U includes extracting user ID U from $P_i$. In another embodiment, passcode $P_i$ and user ID U may be concatenated together or otherwise encoded within the same sequence of bits. Step 906 is optional, and passcode $P_i$ may be sent without any user ID.

In step 908, user ID U is associated with a passcode generator $G_{Ui}$, and passcode generator $G_{Ui}$ is retrieved. Alternatively, in an embodiment in which passcode generators $G_i$ are not indexed according to user ID U, for example, a set of all possible passcode generators $G_i$ may be retrieved. In step 910, for each passcode generator $G_i$ in the database, a method $\Phi_3$ is applied to passcode generator $G_i$, denoted as $\Phi_3(G_i)$, and $\Phi_3(G_i)=P_{Ui}$ is compared to passcode $P_i$. Alternatively, if the passcode generators are indexed, the passcode generator $G_{Ui}$ that is associated with user ID U, a method $\Phi_3$ is applied to passcode generator $G_{Ui}$, denoted as $\Phi_3(G_{Ui})$, and $\Phi_3(G_{Ui})=P_{Ui}$ is compared to passcode $P_i$.

In step 912, if the passcode generators are indexed, a decision is made as to whether $\Phi_3(G_{Ui})$ equals passcode $P_i$. If the passcode generators are not indexed, a decision is made as to whether there is any $\Phi_3(G_i)$ that equals passcode $P_i$. If $\Phi_3(G_{Ui})$ equals passcode $P_i$ or if there is a $\Phi_3(G_i)$ that equals passcode $P_i$, then the passcode $P_i$ submitted by the user is valid, method 900 continues with step 914. In step 914, access to secure entity 103 is granted. Next, in step 916, the value stored for the passcode generator is set equal to a new value $G_{Ui+1}=f(G_{Ui})$ or $G_{i+1}=f(G_i)$, where f is a method, which may be one of the infinite number of perturbing methods (e.g., perturbing functions), as discussed above. If the passcode generators $G_i$ are not indexed according to user ID, the method f is applied only to the passcode generator that matched the submitted passcode $P_i$. After step 916, method 900 terminates.

Returning to step 912, if $\Phi_3(G_{Ui})$ does not equal $P_i$ or if there is no $\Phi_3(G_i)$ that equals $P_i$, then the passcode $P_i$ submitted by the user is invalid, method 900 continues with step 918 where access is not granted. After step 918, in optional step 920 a further check is performed to see if $P_i$ is valid in case there was a human error. Step 920 is discussed further in conjunction FIG. 10. If step 920 is not included in method 900, then step 918 may also include sending a message to the user that passcode $P_i$ is invalid. In other embodiments method 900 may not have all of the steps listed above or may have other steps instead of and/or in addition to those listed above. Additionally the steps of method 900 may not be distinct steps.

Figure 10:
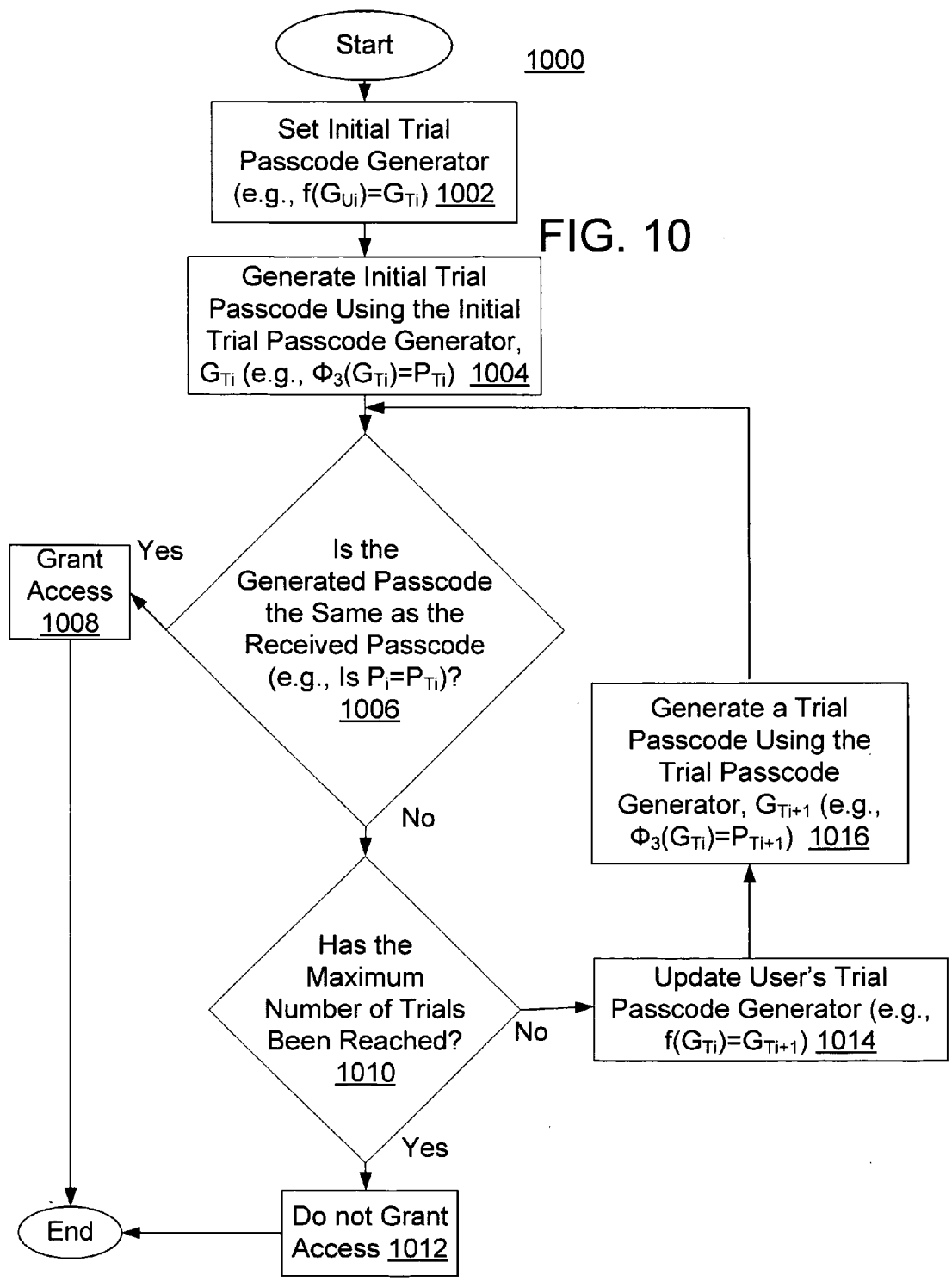
FIG. 10 shows a flowchart of an example of a method for carrying out one of the steps of FIG. 9.

FIG. 10 shows a flowchart of an example of a method for carrying out step 920 of method 900. In step 1002 an initial trial passcode generator, $G_{TUi}$, is computed according to $f(G_{Ui})=G_{TUi}$. In other words, if the user generated a passcode $P_i$, but never submitted passcode $P_i$, then the value of passcode generator $G_i$ at passcode device 101 will be different from passcode generator $G_{Ui}$ or the set of passcode generators $G_i$ at administrator 102. Consequently, one manner for correcting this problem is to advance the value of passcode generator $G_{Ui}$ or of the set of passcode generators $G_i$ to that of the next index value of i, which is accomplished by applying the perturbing method to the current value of passcode generator $G_{Ui}$ or of the set of passcode generators $G_i$. If the passcode generators are not indexed according to user, then the perturbing method needs to be applied to all of the current values of passcode generator $G_i$ to obtain a set of initial trial passcode generators $G_{Ti}$.

Next, in step 1004, for trial passcode generator $G_{TUi}$ or for each trial passcode generator $G_{Ti}$ a trial passcode $P_{TUi}$ or a set of trial passcodes $P_{Ti}$ are generated according to $\Phi_3(G_{TUi})=P_{TUi}$ or $\Phi_3(G_{Ti})=P_{Ti}$. In step 1006, $P_i$ is compared to each of the $P_{Ti}$ or $P_{TUi}$. If passcode $P_{TUi}$ matches passcode $P_i$ or if there are any trial passcodes $P_{Ti}$ that match passcode $P_i$, then step 920 proceeds to step 1008, where access is granted. As part of step 1008, the value of a trial passcode generator $G_{TUi}$ is updated, and the updated value of trial passcode generator $G_{TUi+1}$ is used to replace passcode generator $G_{Ui}$ or the updated value of trial passcode generator $G_{Ti+1}$ is used to replace the passcode generator of the set of passcode generators $G_i$ from which trial passcode generator $G_{Ti+1}$ was generated. After step 1008, step 920 terminates.

Returning to step 1006, if passcode $P_{TUi}$ does not match passcode $P_i$ or if there are no trial passcode $P_{Ti}$ that match passcode $P_i$, then step 920 proceeds to step 1010, where a determination is made as to whether the maximum number of trials has been reached. In other words, it is possible that the user generated multiple passcodes $P_i$ and consequently passcode generator $G_{Ui}$ or one of the set of passcode generators $G_i$ associated with administrator 102 may lag the value of passcode generator $G_i$ at passcode device 101 by several values of index i. Consequently, step 920 may try several applications of perturbing method f before deciding that passcode $P_i$ is invalid. Thus, step 920 may be configured for applying f up until a maximum number of trials. If that maximum has been reached without finding a match, then step 920 proceeds from step 1010 to step 1012, and access is not granted. After step 1012, step 920 terminates.

Returning to step 1010, if the maximum number of trials has not been reached, then step 1010 proceed to step 1014 where the perturbing method f is applied to the trial passcode generator $G_{TUi}$ or trial set of passcode generators $G_{Ti}$ according to $f(G_{Ti})=G_{Ti+1}$ or $f(G_{UTi})=G_{UTi+1}$ Next in step 1016, a new passcode $P_{UTi+1}$ or set of passcodes $P_{Ti+1}$ are generated according to $\Phi_3(G_{Ti})=P_{Ti+1}$ or $\Phi_3(G_{UTi})=P_{UTi+1}$ After step 1016, step 1006 is repeated. Steps 1006, 1010, 1014, and 1016 are repeated until either the maximum number of trials is reached and access is not granted in step 1012 or until a match trial passcode is found, and access is granted in step 1008. In other embodiments, method 1000 may not have all of the steps listed above or may have other steps instead of and/or in addition to those listed above. Additionally the steps of method 1000 may not be distinct steps.

Figure 11:
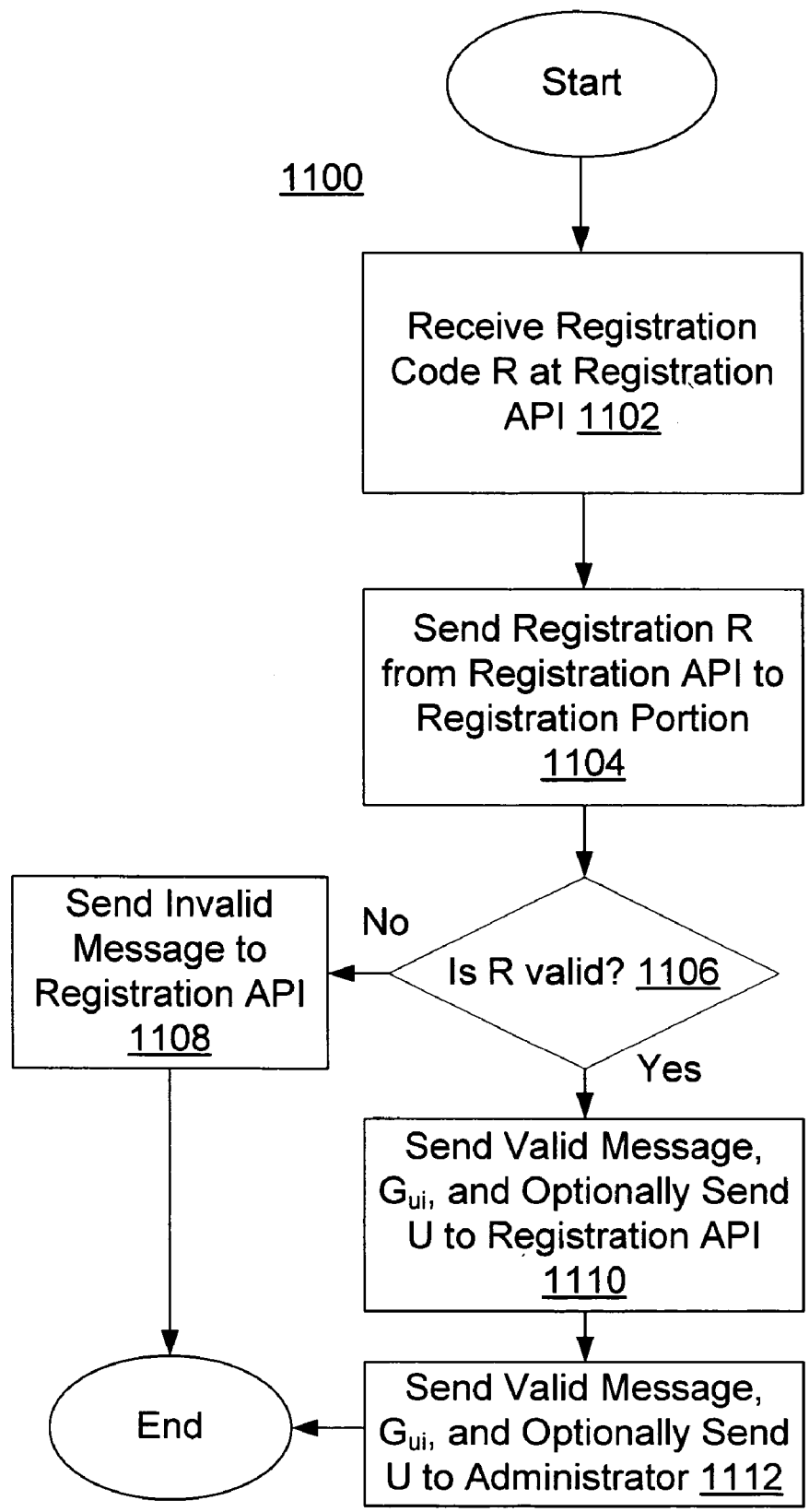
FIG. 11 shows a flowchart of an example of a method for setting up part of a system so that a user may access a secure entity.

FIG. 11 shows a flowchart of an example of a method 1100 for registering a user. Method 1100 is an embodiment of, or may be used as a replacement for, steps 704 and 706 of method 700. In step 1102, the registration code, and optionally other user information, is entered into, transmitted to, and/or received by setup API 145 (FIG. 1C), based on output from passcode device 101. In response, in step 1104 setup API 145 calls setup portion 156 (FIG. 1C) located in administrator 102 (FIG. 1C), and passes registration code R as an argument to setup portion 156 in administrator 102. In step 1106, setup portion 156 determines whether the registration code R is valid. If setup portion 156 determines that registration code R is invalid, method 1100 proceeds to step 1108. In step 1108, a message is sent to setup API 145 that registration code R is invalid. After step 1108, method 1100 terminates. Returning to step 1106, if setup portion 156 determines that registration code R is valid, method 1100 proceeds to step 1110. In step 1110, setup portion 156 sends a passcode generator $G_{Ui}$ or $G_i$ and a message back to setup API 145 that registration code R is valid. Setup portion 156 may also send other information to setup API 145, such as user ID U or other information.

Next, in step 1112, if the registration code R is valid, then setup API 145 transmits arguments, the passcode generator $G_{Ui}$ or $G_i$ and optionally user ID U (which may be used as a database index) to database 160. Optionally, other user information may also be sent to database 160. In other embodiments method 1100 may not have all of the steps listed above or may have other steps instead of and/or in addition to those listed above. Additionally the steps of method 1100 may not be distinct steps.

Figure 12A:
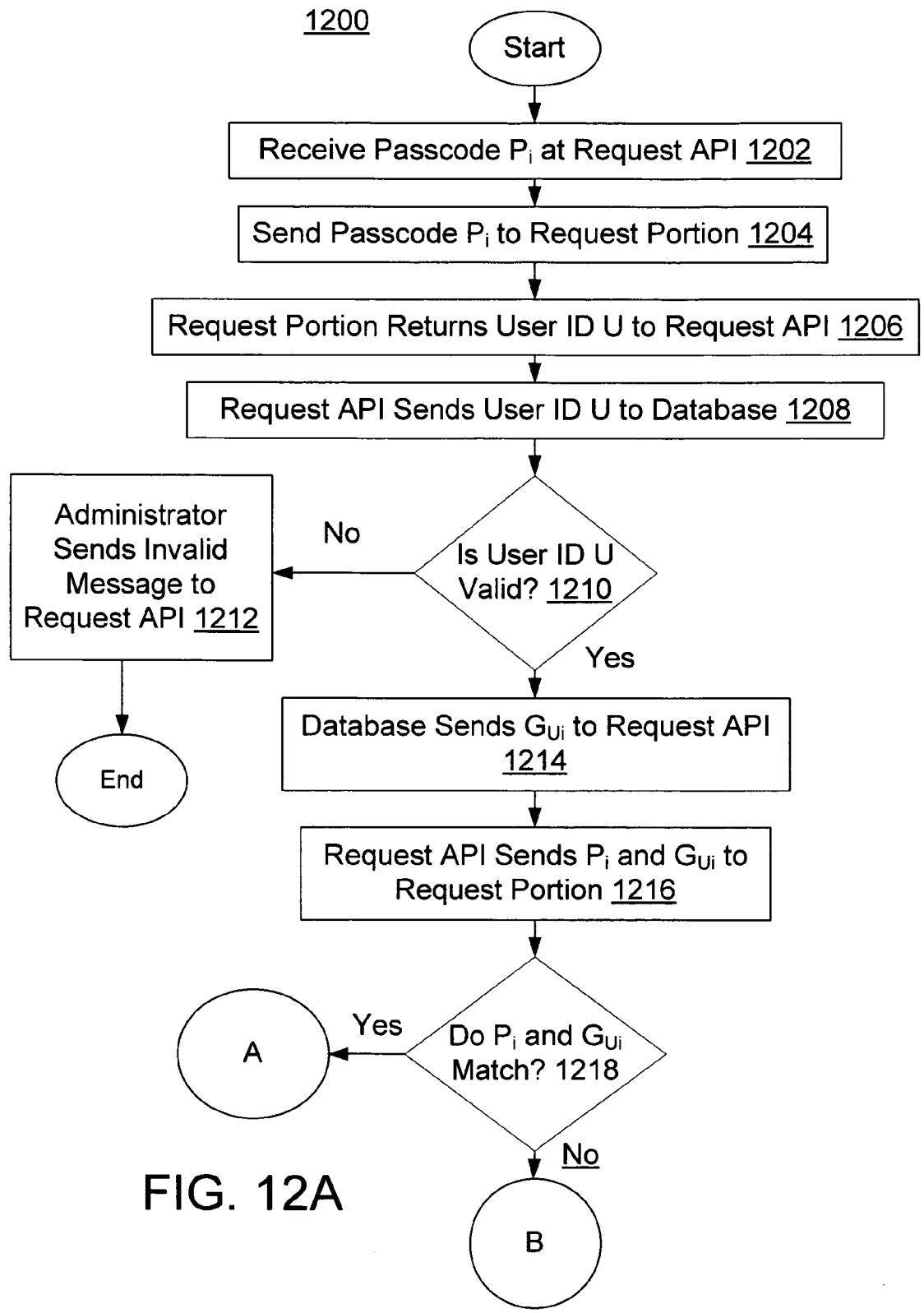
FIGS. 12A and 12B show a flowchart of an example of a method for handling a request for access to a secure entity.
Figure 12B:
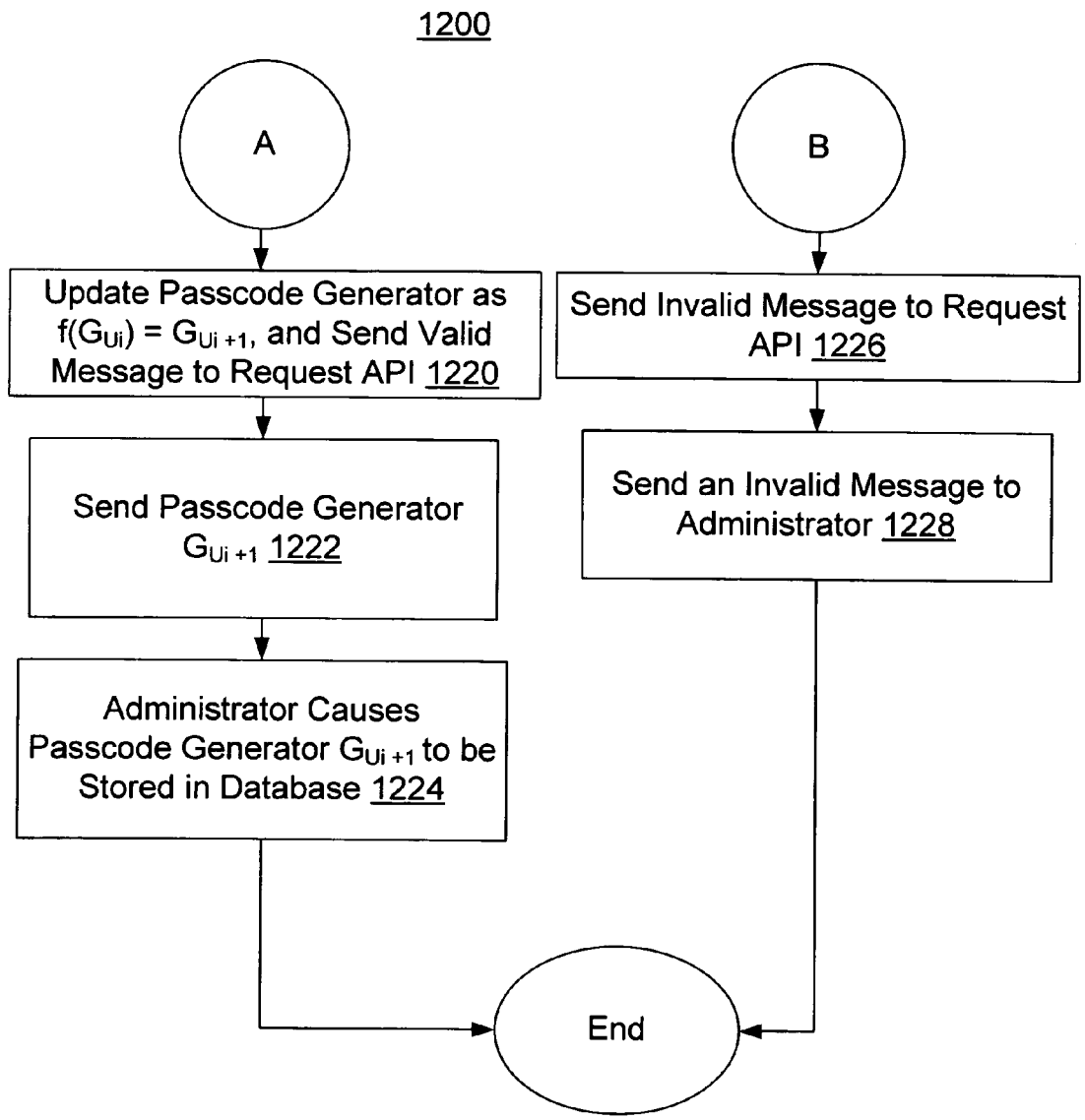

FIGS. 12A and 12B show a flowchart of an example of a method 1200 for authenticating a passcode at administrator 102. Method 1200 is an alternative to method 900. In step 1202, a passcode $P_i$ is received by request API 147. For example, passcode $P_i$ is entered into request API 147 or transmitted to request API 147. In step 1204, administrator 102 retrieves $P_i$ from its request API 147. In step 1206, administrator 102 places user ID U in request API 147. In step 1208, request API 158 sends user ID U to database 160. In step 1210, database 160 decides whether user ID U is valid. Database 160 attempts to retrieve passcode generator $G_{Ui}$ or $G_i$ by looking up user ID U. Database 160 may discover that user ID U does not exist, and therefore is invalid. If user ID U is invalid, then method 1200 proceeds to step 1212. In step 1212, administrator 102 sends an invalid message to request API 147. After step 1212, method 1200 ends. Returning to step 1210, if user ID U is valid, then method 1200 proceeds to step 1214 where administrator 102 sends passcode generator $G_{Ui}$ to request API 147. Next, in step 1216, request API 147 calls request portion 158, and sends two arguments, passcode $P_i$ and passcode generator $G_{Ui}$ to determine whether passcode $P_i$ and passcode generator $G_{Ui}$ match.

In step 1218, request portion 158 determines whether passcode $P_i$ and passcode generator $G_{Ui}$ match. In general, the output of $\Phi_3(G_{Ui})$ is a sequence of bytes and each of these bytes may be a value ranging from 0 to 255. Thus, $P_i$ and $G_{Ui}$ match if $P_i=\Phi_3(G_{Ui})$.

Step 1218 may also include applying an error handling routine, such as method 1000 (FIG. 10), prior to concluding that passcode $P_i$ and passcode generator $G_{Ui}$ do not match. Thus, a determination that passcode $P_i$ and passcode generator $G_{Ui}$ match may involve one or more prior determinations that passcode $P_i$ and trial passcode generator $G_{UTi}$ do not match.

If passcode $P_i$ and passcode generator $G_{Ui}$ match, then method 1200 proceeds to step 1220. In step 1220 request portion 158 updates $G_{Ui}$ according to $f(G_{Ui})=G_{Ui+1}$, returns the updated passcode generator $G_{Ui+1}$ and a message that passcode $P_i$ is valid to request API 147. In step 1222, request API 147 calls administrator 102, and sends a message that passcode $P_i$ is valid, and sends the updated passcode generator $G_{i+1}$ as an argument. Optionally, user ID U is also sent to administrator 102. In step 1224, administrator 102 causes updated passcode generator $G_{i+1}$ to be stored in database 160, indexed by user ID U. After step 1224, method 1200 is terminated.

Returning to step 1218, if passcode $P_i$ and passcode generator $G_{Ui}$ do not match, the method proceeds to step 1226. In step 1226, the request portion 158 returns an invalid message to request API 147. Next, in step 1228, request API 147 calls administrator 102, and sends a message that passcode $P_i$ is invalid. After step 1228, method 1200 terminates. In other embodiments method 1200 may not have all of the steps listed above or may have other steps instead of and/or in addition to those listed above. Additionally the steps of method 1200 may not be distinct steps.

Figure 13:
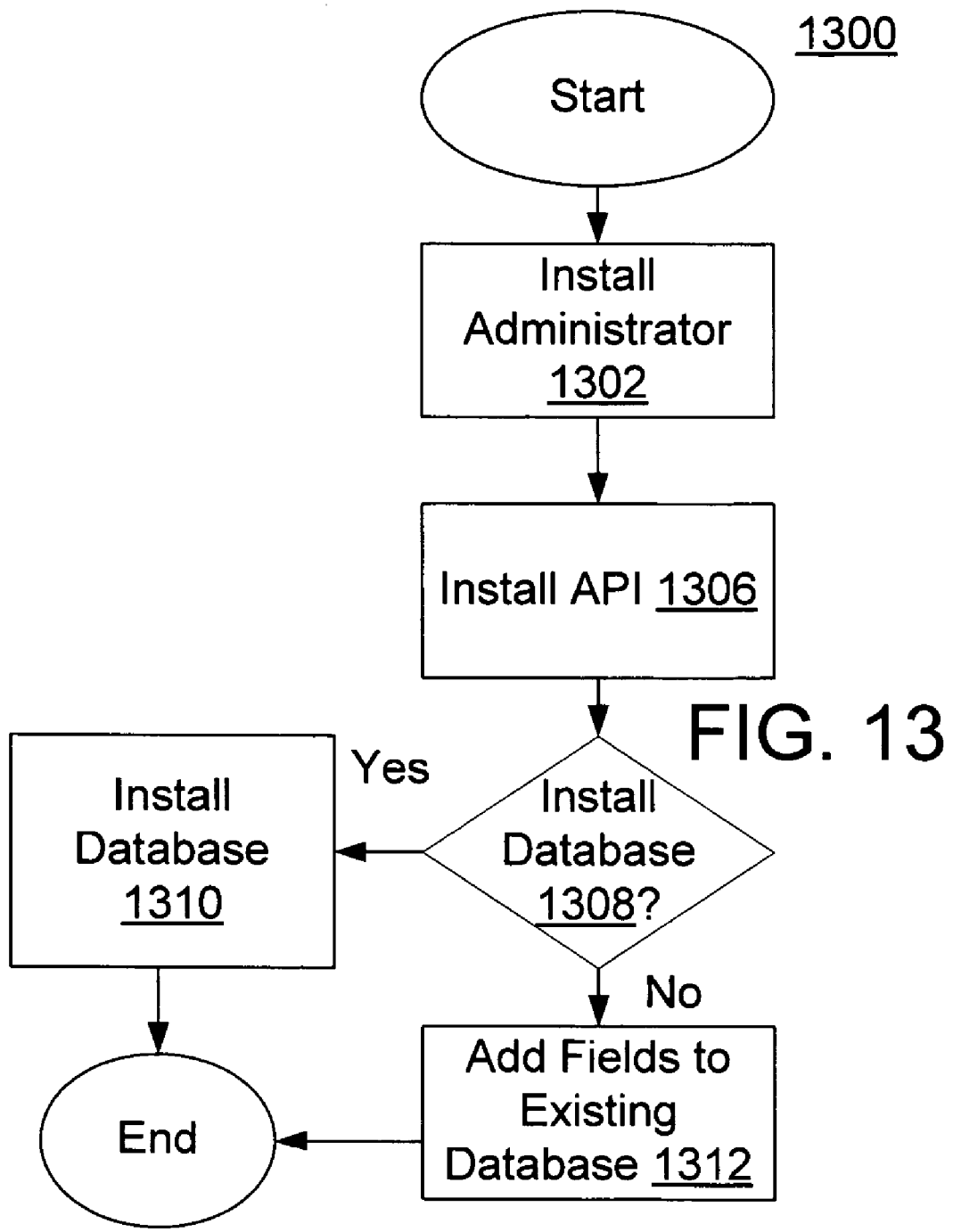
FIG. 13 shows a flowchart of an example of a method of installing a part of the system of FIG. 1A.

FIG. 13 is a flowchart of an example of method of installing system 100. In step 1302 the administrator is installed. For example, administrator 102 may be installed on a computer that is separate from secure entity 103. If the system on which system 100 is being installed has other software, the administrator may be integrated into that software or may be installed as a separate software module. Installing administrator 102 may involve installing setup portion 116 or 156 and request portion 118 or 158. In optional step 1306, an API is installed. In an embodiment, step 1306 may involve installing a request API 147 and a setup API 145. In step 1308, an offer is made to allow the installer to choose whether to use a preexisting database. If the choice of using a preexisting data is chosen, in step 1310 the API is configured to communicate with the database. Step 1310 may involve adding to database 160 a field for storing passcode generators to each user record. Step 1310 may additionally involve adding a field for a user ID U to each user record. For example, database 160 may not have a field for user IDs or may use different user IDs than system 100. Of course, database 160 may have two fields for user IDs—one field in a location where system 100 is configured for accessing, and another which system 100 is not configured to access. Alternatively, the database may already have a field for a user ID, and the same user ID is used for system 100. Returning to step 1308, if a choice is made to not use any preexisting database, then in step 1312, a database, a file, part of a file, or part of a database is setup for storing passcode generators, which may be indexed according to a user ID. In an embodiment, the passcode generators are not indexed according to user ID. In other embodiments, method 1300 may not have all of the steps listed above or may have other steps instead of and/or in addition to those listed above. Additionally, steps 1302, 1306, and 1308 may be performed concurrently or in any order with respect to one another. Steps 1310 and 1312 may be performed any time after step 1308, but otherwise may be performed in concurrently or in any order with respect to steps 1302, and 1306. Additionally the steps of method 1300 may not be distinct steps.

Figure 14:
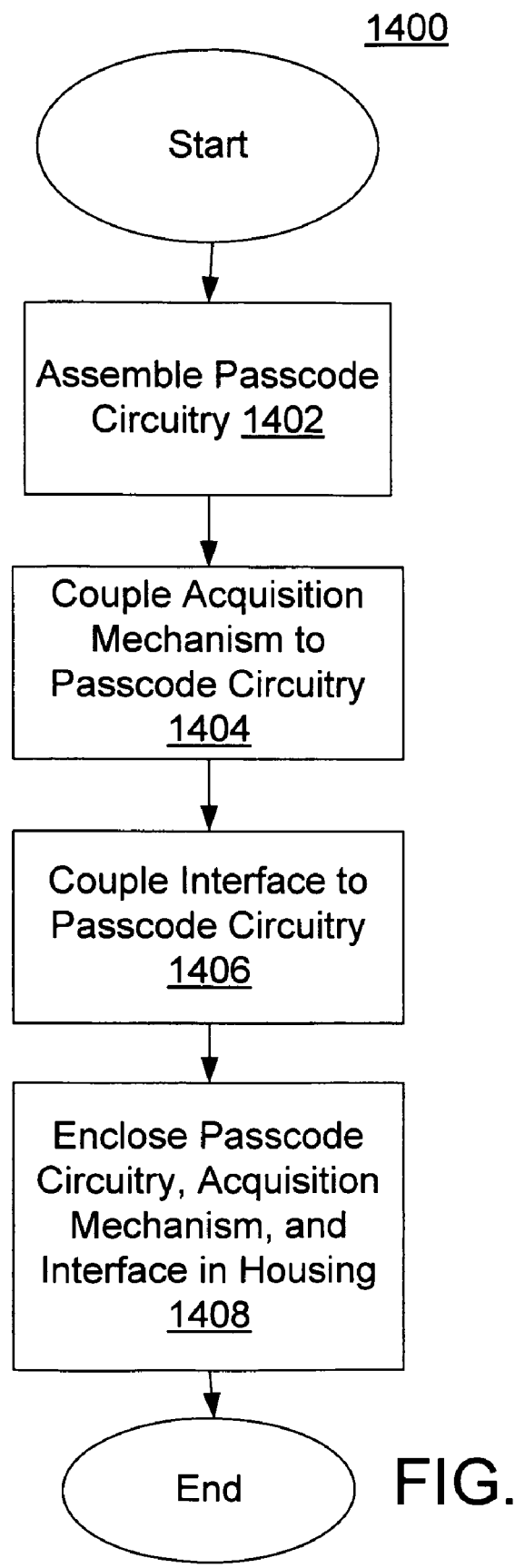
FIG. 14 shows a flowchart of an example of a method for assembling the passcode device.

FIG. 14 is a flowchart of an example of a method 1400 for assembling passcode device 101. In step 1402, passcode circuitry 602 (FIG. 6) is assembled, which may include installing onboard memory (e.g., secure area 604). In step 1404, the acquisition mechanism 608 (FIG. 6) is coupled to the passcode circuitry 602. In step 1406, interface 610 (FIG. 6) is coupled to passcode circuitry 602. In step 1408, an embedded program (e.g., program 605) is configured for generating registration codes R, passcode generators $G_i$, and passcodes $P_i$, and for using the onboard memory for work space and for storing passcode generators. In step 1410, passcode circuitry 602, acquisition mechanism 608, and interface 610 are enclosed within a housing that is small enough to fit within a user's hand (e.g., shorter than a typical pen and no more than a two or three times wider than a typical pen). For example, the housing may be 2 to 6 inches long and less than a half inch in diameter. The passcode device 101 may be of a size that is comparable to a thumb print. In other words, passcode device 101 only need to be large enough to accept user information. In embodiments where the user information is fingerprints, the passcode device 101 could be the size of a portion of a thumb large enough to capture a thumb print during a swipe, for example. In embodiments where acquisition mechanism is a camera, passcode device 101 does not need to be much larger than a small camera. In an embodiment, passcode device 101 is less than 6 inches, less than 2 inches, less than an inch, or less than a centimeter in size. In other embodiments method 1400 may not have all of the steps listed above or may have other steps instead of and/or in addition to those listed above. Additionally, the steps of method 1400 may be performed in other orders, may not be distinct steps, and/or many of the may be performed concurrently with one another. Additionally the steps of method 1400 may not be distinct steps.

A particular application of system 100 is a child identity program. System 100 enables the government to identify a child with a unique registration code R or with a passcode $P_i$, which is never stored anywhere. For example, the FBI can store a database of registration codes R, but a database intruder would not have access to the biometric data, social security number, or other data of any child. Alternatively, the FBI can store a database of generators $G_i$, which change each time a new passcode $P_i$ is submitted. Consequently, in addition to the database intruder not having access to the biometric data of any child, the information stolen (passcode generator $G_i$) is of little use to the intruder in identifying the child, because passcode generator $G_i$ changes periodically, such as with each legitimate access of the data. Similarly, no authorized FBI employee would have access to the biometric data of any child. Consequently, the passcode generator helps act as a child ID for safety, yet also protects private information about the child.

The present specification incorporates herein by reference, in their entirety National Institute of Standards and Technology, Secure Hash Standard, Apr. 17, 1995. FIPS PUB 180-1, Page 88, and National Institute of Standards and Technology, Secure Hash Standard, (draft) 2001. Draft FIPS PUB 180-2, Page 89.

Each of the above embodiments may be used separately from one another in combination with any of the other embodiments. All of the above embodiments may be used together. For example, the different embodiments of passcode device 101 and administrators 102 may all be used in the same system 100. Similarly, the different aspects of each component may be used together or separately. For example, a passcode device 101 may include any one or any combination of no operating system, a secure area, embedded software, and/or being configured to function as a standalone device.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A method comprising:
after a registration process is complete, receiving at a machine a request for access from a user, the request including a user-generated passcode
that is valid temporarily, and
that is generated by applying at least one function at least one time to information associated with the user;
in response to the receiving the user-generated passcode, generating, via the machine, which runs an automated administrator, an administrator-generated passcode that is valid temporarily, wherein the administrator-generated passcode is generated by the automated administrator encrypting a current passcode generator derived by the automated administrator retrieving a prior passcode generator from a storage area of a storage unit and, in response to a prior attempted access being permitted, applying at least one function at least one time to perturb the prior passcode generator, and saving results of applying of the at least one function as the current passcode generator, the current passcode generator being the prior passcode generator being associated with the user; and
determining whether a current attempted access is permitted, based on whether the user-generated passcode and the administrator-generated passcode match, and if the user generated passcode matches the administrator generated passcode granting the request for access.

2. The method of claim 1, wherein the information is biometric data.

3. A method comprising:
generating, via a machine, at least one passcode that is valid temporarily, wherein the passcode is based on information associated with a user by being based on a passcode generator that is based the information associated with the user;
the generating including at least retrieving at least one passcode generator from a storage unit associated with the machine;
the machine generating the at least one passcode from the at least one passcode generator, the at least one passcode that was generated will be referred to as the at least one passcode generated;

and determining whether an attempted access is permitted, based on the passcode generated, by at least determining whether the at least one passcode generated matches a passcode received;
   if the at least one passcode generated matches the passcode received,
      granting the user access to a secure entity,
      perturbing one passcode generator of the at least one passcode generator to create a new passcode generator, and
      storing the new passcode generator in place of the at least one passcode generator;
wherein the information is a fingerprint.

4. A method comprising:
generating, via a machine, a passcode that is valid temporarily, wherein the passcode is based on information associated with a user;
determining whether an attempted access is permitted, based on the passcode, by at least
   determining whether the passcode generated matches a passcode received, which is a passcode that was received by the machine;
   if there is a match, permitting the attempted access;
wherein the generating of the passcode includes at least:
   retrieving a prior passcode generator from a storage unit associated with the machine;
   generating a current passcode generator by at least perturbing the prior passcode generator, which is based on the information; and
   generating the passcode from the current passcode generator, the passcode being based on the information by being based on the current passcode generator, which is derived from the prior passcode generator, which is based on the information, the current passcode generator having been stored in place of the prior passcode generator as a result of an attempted access being permitted;
   wherein the current passcode generator is only temporarily valid.

5. A method comprising:
generating, via a machine, a passcode that is valid temporarily, wherein the passcode is based on information associated with a user, the passcode will be referred to as a passcode generated; and
determining whether an attempted access is permitted, based on the passcode generated, by at least determining whether the passcode generated matches a passcode received;
wherein the generating of the passcode generated includes at least
   generating a current passcode generator based on the information, the passcode being based on the information by being based on the passcode generator that is associated with the information; and
   generating the passcode from the current passcode generator;
the method further including at least if it is determined that the passcode generated matches the passcode received, granting access to the user;
   applying a function to the current passcode generator to generate a new passcode generator; and
   storing the new passcode generator in place the current passcode generator.

6. The method of claim 1, wherein the passcode generated is associated with a timestamp.

7. The method of claim 1, the request for access including a user-generated passcode that is generated on a user device, the generation of the user-generated passcode on the user device being self contained on the user device, and the method further comprises receiving a value for the passcode that was generated by the user; wherein the determining includes at least determining whether the value received matches the administrator-generated passcode.

8. The method of claim 7, wherein the receiving of the value for the user-generated passcode includes at least receiving signals caused by pressing multiple keys, each key that is pressed corresponds to a symbol that is part of the user-generated passcode.

9. The method of claim 7, wherein the receiving of the value for the user-generated passcode includes at least receiving signals from an independent device associated with the user.

10. The method of claim 1, the user generated-passcode being a first session user-generated passcode for accessing an entity, the receiving of the first session user-generated passcode initiating a first session, the method further comprising receiving a second session user-generated passcode that is based on the information for accessing the resource, the receiving of the second session user-generated passcode initiating a second session.

11. The method of claim 10, further comprising during the second session generating a second session passcode generator based on a first session passcode generator that was generated during the second session, generating a second session administrator-generated passcode from the second session passcode generator, and determining whether to grant access by at least comparing the second session administrator generated passcode to the second session user-generated passcode.

12. A method comprising:
receiving at a machine a passcode from a user;
retrieving at least one passcode generator from a storage unit associated with the machine;
generating at least one passcode from the at least one passcode generator;
determining whether the at least one passcode of the at least one passcode generated matches the passcode received;
if the one passcode matches the passcode received,
   granting the user access to a secure entity,
   perturbing the at least one passcode generator of the at least one passcode generator to create a new passcode generator, and
   storing the new passcode generator in place of the at least one passcode generator.

13. The method of claim 12, wherein the retrieving of the at least one passcode generator includes at least retrieving a set of passcode generators;
   the generating of the at least one passcode includes at least generating, for a current passcode generator of the set, a current passcode from the current passcode generator;
   the determining includes at least determining whether the current passcode matches the passcode received;
   the method further comprises
   if the current passcode does not match the passcode received,
      changing the current passcode generator to another passcode generator of the set, and
      repeating the generating and the determining,
      wherein if the one passcode matches the passcode received includes at least if the current passcode matches the passcode received,
         granting the user access to the secure entity,
         perturbing the current passcode generator to create a new passcode generator, and storing the new passcode generator in place of the current passcode generator;

the method also comprising if the generating and the determining have been repeated for each passcode generator of the set, and a passcode that matches the passcode received has not been found, then denying the user access to the secure entity.

14. The method of claim 12, wherein the at least one passcode is only one passcode; and if the one passcode and the passcode received do not match, denying the user access to the secure entity.

15. The method of claim 12, wherein the at least one passcode is only one passcode, and the at least one passcode generator is only one passcode generator;

and if the one passcode and the passcode received do not match, generating a current trial passcode generator from the one passcode generator, generating a current trial passcode from the current trial passcode generator, determining whether the current trial passcode matches the passcode received, generating a new passcode generator from the current trial passcode generator, if the current trial passcode and the passcode received match, replacing the current passcode generator with the new passcode generator, and granting the user access to the secure entity.

16. The method of claim 15, comprising: if the current trial passcode and the passcode received do not match, replacing the current trial passcode generator with the new passcode generator, repeating the generating of the trial passcode, the determining of whether the current trial passcode matches the passcode received, and the generating of the new passcode generator.

17. The method of claim 16, where during the repeating, the generating of the trial passcode, the determining of whether, and the generating of the new passcode generator are repeated until a predetermined maximum number of repetitions is reached or the determining finds a match between the current trial passcode and the passcode received, if the predetermined maximum is reached and the determining does not find a match between the current trial passcode and the passcode received, denying the user access to the secure entity.

18. The method of claim 1, the generating of the administrator-generated passcode is repeated every time the user submits the request for access, and every time the generating is repeated the passcode that is generated is a new passcode.

19. A method comprising:

after a registration process is complete, receiving a request for access at a machine, from a user via a user device, the request including a first user-generated passcode that is valid temporarily, and that is generated by encrypting a second user-generated passcode generated by applying at least one function at least one time to information associated with the user;

generating, via the machine which runs an automated administrator, an administrator-generated passcode that is valid temporarily, wherein the administrator-generated passcode is generated by the automated administrator encrypting a current passcode generator derived by the automated administrator applying at least one function at least one time to a prior passcode generator that is associated with the user, and storage the current passcode generator in place of the prior passcode generator in a storage unit associated with the machine; and determining whether an attempted access is permitted, based on whether the user-generated passcode and the administrator-generated passcode match; if there is a match, granting the request for access; the generating of the administrator-generated passcode is repeated according to a random schedule that is independent of user requests, and every time the generating is repeated the passcode that is generated is a new passcode.

20. A method comprising:

generating, via a machine, a passcode that is valid temporarily, wherein the passcode is based on information associated with a user, the passcode will be referred to as the passcode generated; and determining whether an attempted access is permitted, based on the passcode generated, by at least determining whether the passcode generated and a passcode received match;

wherein the generating of the passcode includes at least generating a current passcode generator based on the information; and generating the passcode from the passcode generator, the generating of the passcode from the passcode generator is performed by applying a function to the passcode generator, the function being such that determining the passcode generator based on the passcode is expected to require a number of computation steps that would likely be required to determine the generator passcode by guessing;

if the passcode generated matches the passcode received, permitting the attempted access;

generating a new passcode generator by applying a function to perturb the current passcode generator; and storing the new passcode generator in place of the current passcode generator in a storage unit associated with the machine.

21. A method comprising:

generating, via a machine, a passcode that is valid temporarily, wherein the passcode is generated form a current passcode generator that is an encryption that is performed by at least performing one application of a function to perturb an encryption of information associated with a user, the passcode being valid for only a short enough period of time so that the passcode is expected to be unlikely to be useful to someone that intercepts the passcode;

determining whether an attempted access is permitted based on the passcode; the passcode is referred to as the passcode generated, the determining includes at least determining whether the passcode generated matches the passcode received;

if the passcode generated matches the passcode received, permitting the attempted access;

generating a new passcode generator by at least perturbing the current passcode generator; and storing the new passcode generator in place of the current passcode generator.

22. A method comprising:

receiving a request for access including a passcode, which will be referred to as a passcode received;

in response to a request for access, generating, via a machine, a passcode, which will be referred to as a passcode generated, the passcode received being valid temporarily, wherein the passcode received is based on information associated with a user, but the information associated with the user is expected not to be determinable based on the passcode received, the passcode generated for a current attempted access being different than the passcodes generated for prior attempted accesses; and also in response to the receiving of the request for access, determining whether an attempted access is permitted based on the request for access, which includes determining whether the passcode generated matches the passcode received;

if the passcode generated matches the passcode received, granting the request for access the generating of the passcode generated being performed by at least generating the passcode generated from a current passcode generator, the current passcode generator being based on the information, and the passcode generated being based on the information by being based on the current passcode generator;

the method further including at least generating a new passcode from the current passcode; and storing the new passcode in place of the current passcode in a storage unit associated with the machine.

23. The method of claim 5, the function being a first function;

the generating of the passcode generated includes at least applying a second function to the passcode generator, the second function being a one-way function and the second function being different than the first function.

24. A method comprising:

after a registration process is complete, receiving a request for access, from a user, the request including a first user-generated passcode that is valid temporarily, and that is generated based on information associated with the user;

in response to the receiving of the user-generated passcode, generating, via a machine that runs an automated administrator, an administrator-generated passcode that is valid temporarily, wherein the administrator-generated passcode is generated by the automated administrator based on information associated with the user by at least the automated administrator generating the administrator generated passcode from a current passcode generator that is based on the information; and determining whether an attempted access is permitted, based on whether the user-generated passcode and the administrator-generated passcode match;

if the user-generated passcode and the administrator-generated passcode match permitting the attempted access;

generating a new passcode generator from the current passcode generator; and storing the new passcode generator in place of the current passcode generator in a storage unit associated with the machine.

* * * * *